United States Patent
Ueno et al.

(10) Patent No.: US 10,061,066 B2
(45) Date of Patent: *Aug. 28, 2018

(54) ONE-SIDED-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

(71) Applicant: NITTO DENKO CORPORATION, Ibaraki-shi, Osaka (JP)

(72) Inventors: Tomonori Ueno, Osaka (JP); Satoshi Mita, Osaka (JP); Yusuke Motegi, Osaka (JP); Jingfan Xu, Osaka (JP); Atsushi Kishi, Osaka (JP); Minoru Miyatake, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/515,887

(22) PCT Filed: Sep. 29, 2015

(86) PCT No.: PCT/JP2015/077576
§ 371 (c)(1),
(2) Date: Mar. 30, 2017

(87) PCT Pub. No.: WO2016/052536
PCT Pub. Date: Apr. 7, 2016

(65) Prior Publication Data
US 2017/0299790 A1    Oct. 19, 2017

(30) Foreign Application Priority Data

Sep. 30, 2014  (JP) .................................. 2014-202623
Sep. 28, 2015  (JP) .................................. 2015-189278

(51) Int. Cl.
*G02B 5/30* (2006.01)
*B32B 7/02* (2006.01)
(Continued)

(52) U.S. Cl.
CPC ................ *G02B 5/305* (2013.01); *B32B 7/02* (2013.01); *B32B 27/08* (2013.01); *B32B 27/306* (2013.01);
(Continued)

(58) Field of Classification Search
CPC ............... G02B 5/00–5/32; G02B 1/14; C08L 29/00–29/14; B32B 7/02; B32B 27/306; B32B 27/08
See application file for complete search history.

(56) References Cited

U.S. PATENT DOCUMENTS

| 2006/0182896 A1 | 8/2006 | Murakami et al. |
| 2006/0227423 A1 | 10/2006 | Saiki et al. |

(Continued)

FOREIGN PATENT DOCUMENTS

| CN | 1550798 A | 12/2004 |
| CN | 1774654 A | 5/2006 |

(Continued)

OTHER PUBLICATIONS

Machine translation of JP2011-227450. Retrieved Oct. 4, 2017.*
(Continued)

*Primary Examiner* — Prashant J Khatri
(74) *Attorney, Agent, or Firm* — Westerman, Hattori, Daniels & Adrian, LLP

(57) ABSTRACT

The present invention pertains to a one-side-protected polarizing film having a transparent protective film on only one surface of a polarizer, wherein: the polarizer contains a polyvinyl alcohol-based resin, has a thickness of 10 μm or less, and is designed to have a single-body transmittance T (Continued)

and a polarization degree P representing optical properties satisfying the condition of the following formula: $P > -(10^{0.929T-42.4}-1) \times 100$ (provided that $T<42.3$) or $P \geq 99.9$ (provided that $T \geq 42.3$); and the other surface of the polarizer has a transparent resin layer having a thickness of 0.2 µm or more and formed from a layer-forming material including a polyvinyl alcohol-based resin. Even when the polarizer has prescribed optical properties and the thickness is 10 µm or less, this one-side-protected polarizing film is capable of suppressing the occurrence of through cracks and nano-slits.

16 Claims, 8 Drawing Sheets

(51) Int. Cl.
 *G02B 1/14* (2015.01)
 *B32B 27/08* (2006.01)
 *B32B 27/30* (2006.01)
 *B32B 37/12* (2006.01)

(52) U.S. Cl.
 CPC ............... *B32B 37/12* (2013.01); *G02B 1/14* (2015.01); *B32B 2551/00* (2013.01); *G02B 5/3025* (2013.01); *G02B 5/3033* (2013.01); *G02B 5/3041* (2013.01)

(56) References Cited

U.S. PATENT DOCUMENTS

| | | | |
|---|---|---|---|
| 2007/0207277 A1 | 9/2007 | Mizushima et al. | |
| 2008/0137187 A1 | 6/2008 | Nishida et al. | |
| 2008/0182937 A1* | 7/2008 | Urian | C08F 8/14 525/57 |
| 2009/0091826 A1 | 4/2009 | Sugino | |
| 2009/0122401 A1 | 5/2009 | Shinagawa et al. | |
| 2010/0221455 A1 | 9/2010 | Kim et al. | |
| 2011/0043733 A1 | 2/2011 | Suzuki et al. | |
| 2011/0163281 A1* | 7/2011 | Bae | B29D 11/00644 252/585 |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057231 A1 | 3/2012 | Goto et al. | |
| 2012/0058291 A1 | 3/2012 | Kitagawa et al. | |
| 2012/0058321 A1 | 3/2012 | Goto et al. | |
| 2012/0094037 A1* | 4/2012 | Banba | C09J 7/00 428/1.5 |
| 2012/0206804 A1 | 8/2012 | Nam et al. | |
| 2013/0220525 A1 | 8/2013 | Kunai | |
| 2014/0057060 A1 | 2/2014 | Fukagawa et al. | |
| 2014/0065429 A1 | 3/2014 | Kunikata et al. | |
| 2014/0285887 A1 | 9/2014 | Goto et al. | |
| 2015/0070761 A1 | 3/2015 | Kitagawa et al. | |
| 2016/0363699 A1 | 12/2016 | Kunai | |

FOREIGN PATENT DOCUMENTS

| | | | |
|---|---|---|---|
| CN | 1860389 A | 11/2006 | |
| CN | 101228462 A | 7/2008 | |
| CN | 101387718 A | 3/2009 | |
| CN | 101692133 A | 4/2010 | |
| CN | 102834748 A | 12/2012 | |
| EP | 1933181 A1 | 6/2006 | |
| JP | 9-104478 A | 4/1997 | |
| JP | 2003-121618 A | 4/2003 | |
| JP | 2004-061565 A | 2/2004 | |
| JP | 2004-223993 A | 8/2004 | |
| JP | 2005-43858 A | 2/2005 | |
| JP | 2009-169333 A | 7/2009 | |
| JP | 2010-9027 A | 1/2010 | |
| JP | 4751481 B1 | 8/2011 | |
| JP | 2011-221185 A | 11/2011 | |
| JP | 2011-221278 A | 11/2011 | |
| JP | 2011-227450 A | 11/2011 | |
| JP | 2011227450 A * | 11/2011 | ........... G02B 5/3033 |
| JP | 2013-068804 A | 4/2013 | |
| JP | 2013-72951 A | 4/2013 | |
| JP | 2013-160775 A | 8/2013 | |
| JP | 2013-254072 A | 12/2013 | |
| JP | 2014-59547 A | 4/2014 | |
| JP | 5504232 B2 | 5/2014 | |
| JP | 2014-119501 A | 6/2014 | |
| JP | 2015-161782 A | 9/2015 | |
| KR | 10-2006-009837 A | 2/2006 | |
| KR | 10-2010-0097076 A | 9/2010 | |
| KR | 10-2012-0099172 A | 9/2012 | |
| KR | 10-2013-0018227 A | 2/2013 | |
| KR | 10-2014-0074260 A | 6/2013 | |
| KR | 10-2014-0114733 A | 9/2014 | |
| TW | 200801609 A | 1/2008 | |
| TW | 201345962 A | 11/2013 | |
| TW | 201430405 A | 8/2014 | |
| TW | 201434643 A | 9/2014 | |
| WO | 2009/099049 A1 | 8/2009 | |
| WO | 2009/145150 A1 | 12/2009 | |
| WO | 2011/125958 A1 | 10/2011 | |
| WO | 2014/091894 A1 | 6/2014 | |
| WO | 2015/194523 A1 | 12/2015 | |

OTHER PUBLICATIONS

International Search Report dated Dec. 22, 2015, issued in counterpart of International Application No. PCT/JP2015/077576 (2 pages).
Office Action dated Aug. 19, 2016, issued in counterpart of Japanese Patent Application No. 2015-189278 with English Translation (13 pages).
Decision to Grant a Patent dated Dec. 12, 2016, issued in counterpart of Japanese Application No. 2015-189278 w/English translation (6 pages).
Office Action dated May 9, 2017 issued in Taiwanese application No. 104132127 (counterpart to U.S. Appl. No. 15/515,885), with English translation. (6 pages).
Office Action dated May 9, 2017, issued in counterpart Taiwanese Application No. 104132123, with English translation. (6 pages).
Notification of Transmittal of Translation of the International Prelminary Report on Patentability (Form PCT/IB/338) issued in counterpart International Application No. PCT/JP2015/077576 dated Apr. 13, 2017, with Forms PCT/IB/373 and PCT/ISA/237. (7 pages).
Office Action dated Jan. 3, 2018, issued in counterpart Chinese application No. 201580053067.4 with English translation. (13 pages).
Office Action dated Oct. 27, 2017, issued in Korean Application No. 10-2017-7009611, with English translation (7 pages).
Office Action dated Nov. 9, 2017, issued in Korean Application No. 10-2017-7009610, with English translation (7 pages).
Office Action dated Oct. 10, 2017, issued in Chinese Application No. 201580053060.2, with English translation (11 pages).
Office Action dated Oct. 16, 2017, issued in Chinese Application No. 201580053076.3 , with English translation (11 pages).
Office Action dated Oct. 27, 2017, issued in counterpart Korean Application No. 10-2017-7008777, with English translation (4 pages).
Office Action dated Feb. 26, 2018, issued in Korean application No. 10-2017-7009611 which is counterpart to related U.S. Appl. No. 15/515,885 (7 pages) with machine translation.
Notice of Allowance dated Feb. 27, 2018, issued in counterpart Korean application No. 10-2017-7008777 (3 pages).
Office Action dated Mar. 20, 2018, issued in Chinese Application No. 201580053076.3, which is counterpart to related U.S. Appl. No. 15/515,890, with English translation. (16 pages).

(56) References Cited

OTHER PUBLICATIONS

Notice of Allowance dated Mar. 28, 2018, issued in Korean Application No. 10-2017-7009610, which is counterpart to related U.S. Appl. No. 15/515,890, with English translation. (5 pages).
Notice of Allowance dated Jun. 21, 2018, issued in Korean Patent Application No. 10-2017-7009611.

* cited by examiner

FIG.4A
Normal one-side-protected polarizing film (before heating)

FIG.4B
One-side-protected polarizing film suffering from nano-slit (before heating)

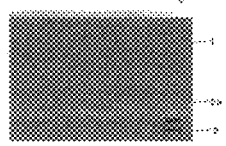

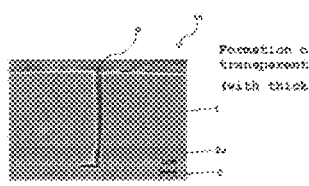

FIG.4C
One-side-protected polarizing film with expanded nano-slit (after heating)

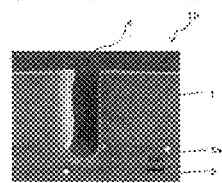

FIG.4D
Transparent resin layer-attached one-side-protected polarizing film in which nano-slit is repaired by transparent resin layer

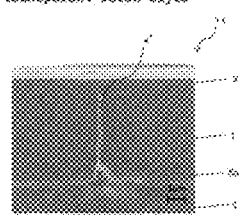

FIG.4E
Transparent resin layer-attached one-side-protected polarizing film in which nano-slit does not expand even after heating

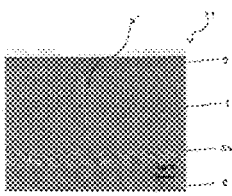

FIG.4F
Transparent resin layer-attached one-side-protected polarizing film in which nano-slit expands after heating

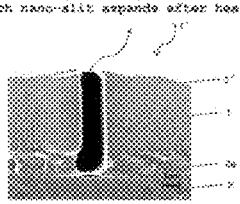

ONE-SIDED-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

TECHNICAL FIELD

The invention relates to a one-side-protected polarizing film including a polarizer and a transparent protective film provided on only one surface of the polarizer and to a pressure-sensitive-adhesive-layer-attached polarizing film including the one-side-protected polarizing film and a pressure-sensitive adhesive layer. The one-side-protected polarizing film and the pressure-sensitive-adhesive-layer-attached polarizing film may be used alone or as a component of a multilayer optical film to form an image display device such as a liquid crystal display (LCD) or an organic electroluminescent (EL) display.

BACKGROUND ART

The image forming system of liquid crystal display devices has polarizing films placed as essential components on both sides of glass substrates that form the liquid crystal panel surfaces. A polarizing film generally used includes a polarizer and a transparent protective film or films bonded to one or both surfaces of the polarizer with a polyvinyl alcohol-based adhesive or any other adhesive, in which the polarizer includes a polyvinyl alcohol-based film and a dichroic material such as iodine.

In general, a pressure-sensitive adhesive is used to bond such a polarizing film to a liquid crystal cell or any other component. The pressure-sensitive adhesive is provided as a pressure-sensitive adhesive layer in advance on one surface of the polarizing film because such a pressure-sensitive adhesive layer has advantages such as the ability to instantly fix the polarizing film and no need to perform a drying step for fixing the polarizing film. Thus, a pressure-sensitive-adhesive-layer-attached polarizing film is generally used when a polarizing film is bonded.

Polarizing films and pressure-sensitive-adhesive-layer-attached polarizing films have a problem in that in a harsh environment accompanied by thermal shock (e.g., a heat shock test in which −30° C. and 80° C. temperature conditions are repeated, or a test at a high temperature of 100° C.), the polarizer undergoes changes in shrinkage stress, so that cracks (through cracks) can easily occur entirely in the direction of the absorption axis of the polarizer. In other words, pressure-sensitive-adhesive-layer-attached polarizing films have insufficient durability to thermal shock in the harsh environment mentioned above. For thickness reduction, a pressure-sensitive-adhesive-layer-attached polarizing film can be produced using a one-side-protected polarizing film including a polarizer and a transparent protective film provided on only one surface of the polarizer. Particularly, such a pressure-sensitive-adhesive-layer-attached polarizing film has insufficient durability to the thermal shock mentioned above. In addition, the thermal shock-induced through cracks become more likely to occur as the size of the polarizing film increases.

In order to suppress the occurrence of the through cracks, for example, it is proposed to provide a pressure-sensitive-adhesive-layer-attached polarizing film including a one-side-protected polarizing film, a protective layer provided on the polarizing film and having a tensile elastic modulus of 100 MPa or more, and a pressure-sensitive adhesive layer provided on the protective layer (Patent Document 1). It is also proposed to provide a pressure-sensitive-adhesive-layer-attached polarizing film including a polarizer with a thickness of 25 µm or less, a protective layer provided on one surface of the polarizer and including a product obtained by curing a curable resin composition, a transparent protective film provided on the other surface of the polarizer, and a pressure-sensitive adhesive layer provided on the outer side of the protective layer (Patent Document 2). The pressure-sensitive-adhesive-layer-attached polarizing films described in Patent Documents 1 and 2 are effective in terms of suppressing the occurrence of through cracks. In view of suppression of the occurrence of through cracks, thickness reduction, and weight reduction, it is proposed to form a protective layer on at least one surface of a polarizer from a water-soluble, film-forming composition (polyvinyl alcohol-based resin composition) (Patent Document 3). In addition, polarizers have also been reduced in thickness. For example, it is proposed to provide a thin polarizer having controlled optical properties including a controlled single-body transmittance and a controlled degree of polarization and also having high orientation (Patent Document 4).

PRIOR ART DOCUMENTS

Patent Documents

Patent Document 1: JP-A-2010-009027
Patent Document 2: JP-A-2013-160775
Patent Document 3: JP-A-2005-043858
Patent Document 4: JP-B1-4751481

SUMMARY OF THE INVENTION

Problems to be Solved by the Invention

Patent Documents 1 and 2 disclose that a reduction in thickness is achieved by using a one-side-protected polarizing film having a transparent protective film on only one surface of a polarizer, while a protective layer is provided to suppress the occurrence of through cracks in the direction of the absorption axis of the polarizer, which would otherwise be caused by the use of the one-side-protected polarizing film. Patent Document 3 also shows that a protective layer provided on a polarizer can suppress the occurrence of through cracks in the direction of the absorption axis of the polarizer.

On the other hand, polarizers have also been reduced in thickness. When a thinner polarizer (e.g., 10 µm or less in thickness) is used to form a polarizing film or a pressure-sensitive-adhesive-layer-attached polarizing film, changes in shrinkage stress in the polarizer become smaller. Therefore, it has been found that the use of a thinner polarizer makes it possible to suppress the occurrence of through cracks.

However, it has been found that, even through the occurrence of through cracks is suppressed in a one-side-protected polarizing film or a pressure-sensitive-adhesive-layer-attached polarizing film produced therewith, extremely-fine partial cracks (hereafter also referred to as nano-slits) can occur in the absorption axis direction of the polarizer when the optical properties are controlled and the polarizer used is thin (e.g., 10 µm or less in thickness) as described in Patent Document 4, and mechanical shock is applied to the one-side-protected polarizing film or the pressure-sensitive-adhesive-layer-attached polarizing film produced therewith (including a case where a load is applied to the polarizer side by downward bending). It has also been found that the nano-slits can occur regardless of the polarizing film size. It has also been found that the nano-slits do not occur when a double-side-protected polarizing film is used, which includes a polarizer and transparent protective films on both surfaces of the polarizer. It has also been found that when a through crack occurs in a polarizer, any other through crack will not occur adjacent to the through crack because the stress around the through crack is released, and that in contrast, not only a nano-slit can occur alone but also nano-slits can occur adjacent to each other. It has also been found that a through crack once formed in a polarizer has the ability to progressively extend in the absorption axis direction of the polarizer, and that in contrast, nano-slits have no ability to progressively extend. Thus, it has been found that the nano-slit is a new problem, that occurs when a thin polarizer with optical properties controlled within specific ranges is used to form a one-side-protected polarizing film in which the occurrence of through cracks is suppressed, and that the nano-slit is a problem caused by a phenomenon different from that responsible for the through crack.

In addition, the nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. In other words, nano-slits are difficult to detect by automatic optical inspection, which is generally used for defect inspection of a one-side-protected polarizing film being produced in the form of a long strip. It has also been found that when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

Thus, it is desired to suppress not only the occurrence of through cracks but also the occurrence of nano-slits in a one-side-protected polarizing film having a polarizer with a thickness of 10 or less or in a pressure-sensitive-adhesive-layer-attached polarizing film produced with such a one-side-protected polarizing film.

It is an object of the invention to provide a one-side-protected polarizing film that includes a polarizer and a transparent protective film on only one surface of the polarizer and resists the occurrence of through cracks and nano-slit-induced defects even when the polarizer has specific optical properties and a thickness of 10 μm or less. It is another object of the invention to provide a pressure-sensitive-adhesive-layer-attached polarizing film including such a one-side-protected polarizing film and a pressure-sensitive adhesive layer.

It is a further object of the invention to provide an image display device having such a one-side-protected polarizing film or such a pressure-sensitive-adhesive-layer-attached polarizing film, and to provide a method for continuously producing such an image display device.

Means for Solving the Problems

As a result of intensive studies, the inventors have accomplished the invention based on findings that the problems can be solved by the one-side-protected polarizing film, the pressure-sensitive-adhesive-layer-attached polarizing film, and other means described below.

That is, the present invention relates to a one-side-protected polarizing film, comprising:
a polarizer;
a transparent protective film provided on only one surface of the polarizer; and
a transparent resin layer provided on another surface of the polarizer, wherein
the polarizer comprises a polyvinyl alcohol-based resin, has a thickness of 10 μm or less, and is designed to have a single-body transmittance T and a polarization degree P representing optical properties satisfying the condition of the following formula: $P > -(10^{0.929T-42.4}-1) \times 100$ (provided that T<42.3) or P≥99.9 (provided that T≥42.3), and
the transparent resin layer has a thickness of 0.2 μm or more and is a product made from, a layer-forming material comprising a polyvinyl alcohol-based resin.

In the one-side-protected polarizing film, the transparent resin layer preferably has a heat of crystal fusion of 30 mj/mg or more.

In the one-side-protected polarizing film, the transparent resin layer preferably has the thickness of less than 3 μm.

In the one-side-protected polarizing film, the polyvinyl alcohol-based resin preferably has a saponification degree of 99.0% or more and an average degree of polymerization of 1,000 or more. In the one-side-protected polarizing film, the layer-forming material may be a composition free of any curable component. The polyvinyl alcohol-based resin preferably is a polyvinyl alcohol resin.

In the one-side-protected polarizing film, the polarizer preferably contains 25% by weight or less of boric acid based on the total weight of the polarizer.

Further, the present invention relates to a pressure-sensitive-adhesive-layer-attached polarizing film comprising: the one-side-protected polarizing film; and a pressure-sensitive adhesive layer.

The pressure-sensitive-adhesive-layer-attached polarizing film may be used in such a form that the pressure-sensitive adhesive layer is provided on the transparent resin layer of the one-side-protected polarizing film. Alternatively, the pressure-sensitive-adhesive-layer-attached polarizing film may be used in such a form that the pressure-sensitive adhesive layer is provided on the transparent protective film of the one-side-protected polarizing film. A separator may also be provided on the pressure-sensitive adhesive layer of the pressure-sensitive-adhesive-layer-attached polarizing film. The pressure-sensitive-adhesive-layer-attached polarizing film provided with the separator can be used in the form of a roll.

Further, the present invention relates to an image display device comprising the one-side-protected polarizing film or the pressure-sensitive-adhesive-layer-attached polarizing film.

Further, the present invention relates to a method for continuously producing an image display device, the method comprising the steps of:
unwinding the pressure-sensitive-adhesive-layer-attached polarizing film from the roll of the pressure-sensitive-adhesive-layer-attached polarizing film;
feeding the pressure-sensitive-adhesive-layer-attached polarizing film with the separator; and
continuously bonding the pressure-sensitive-adhesive-layer-attached polarizing film to a surface of an image display panel with the pressure-sensitive adhesive layer interposed therebetween.

Effect of the Invention

The one-side-protected polarizing film and the pressure-sensitive-adhesive-layer-attached polarizing film of the invention include a polarizer with a thickness of 10 μm or less and are made thin. The thin polarizer with a thickness of 10 μm or less resists the occurrence of through cracks because changes in the shrinkage stress applied to the polarizer by thermal shock are smaller in the thin polarizer than in thick polarizers.

On the other hand, nano-slits are more likely to occur in thin polarizers having specific optical properties. Nano-slits seem to occur when mechanical shock is applied to the one-side-protected polarizing film or the pressure-sensitive-adhesive-layer-attached polarizing film produced therewith, in the process of producing the one-side-protected polarizing film, in the process of producing the pressure-sensitive-adhesive-layer-attached polarizing film by forming a pressure-sensitive adhesive layer on the one-side-protected polarizing film, or various processes after the production of the pressure-sensitive-adhesive-layer-attached polarizing film. Nano-slits are assumed to be caused by a mechanism different from that responsible for through cracks caused by thermal shock. In addition, when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

In the one-side-protected polarizing film of the invention and the pressure-sensitive-adhesive-layer-attached polarizing film of the invention, the transparent resin layer with a thickness of 0.2 μm or more provided on the other surface of the polarizer (the surface opposite to its surface on which the transparent protective film is provided) can suppress the occurrence of the nano-slits.

As described above, the one-side-protected polarizing film of the invention and the pressure-sensitive-adhesive-layer-attached polarizing film produced therewith have the transparent resin layer with a thickness of 0.2 μm or more formed from a layer-forming material including a polyvinyl alcohol-based resin, which makes it possible to reduce the thickness to a satisfactory level and to suppress the occurrence of through cracks and nano-slits in the polarizer.

The nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. It has also been found that when the one-side-protected polarizing film or the pressure-sensitive-adhesive-layer-attached polarizing film is placed in a heated environment, nano-slits can expand in the widthwise direction, so that nano-slit-induced defects can be detected (e.g., as the presence or absence of light leakage). The transparent resin layer can suppress the occurrence of defects due to the expansion of nano-slits in the widthwise direction even if the nano-slits occur in the polarizer of a one-side-protected polarizing film obtained before the formation of the transparent resin layer.

The transparent resin layer, which is a part of the one-side-protected polarizing film, should allow the polarizing film to maintain a certain level of polarization degree even in a high-temperature, high-humidity environment or in a warm-water environment. Thus, the transparent resin layer is made from a layer-forming material including a water-soluble polyvinyl alcohol-based resin as a main component. Under these conditions, when the heat of crystal fusion of the transparent resin layer is controlled to 30 mj/mg or more, the transparent resin layer can suppress the occurrence of through crack-induced and nano-slit-induced defects, and can allow the polarizing film to have a satisfactory level of moist heat resistance in a high-temperature, high-humidity environment or a satisfactory level of water resistance in a warm-water environment.

For example, a polyvinyl alcohol-based resin with a saponification degree of 99.0% or more and an average degree of polymerization of 1,000 or more may be used in order to control the heat of crystal fusion of the transparent resin layer to 30 mj/mg or more.

BRIEF DESCRIPTION OF THE DRAWINGS

FIGS. 4(A) to 4(F) are exemplary photographs of cross-sections of one-side-protected polarizing films, which show the presence or absence of a nano-slit and show that heating-induced expansion of a nano-slit differs depending on the presence or absence of a transparent resin layer.

MODE FOR CARRYING OUT THE INVENTION

Figure 1:
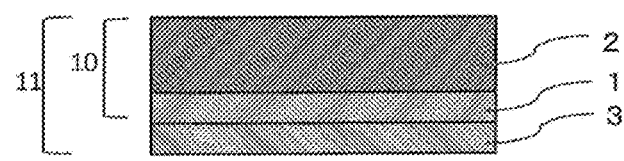
FIG. 1 is a schematic cross-sectional view of an example of the one-side-protected polarizing film of the invention.

Hereinafter, the one-side-protected polarizing film 11 of the invention and the pressure-sensitive-adhesive-layer-attached polarizing film 12 of the invention will be described with reference to FIGS. 1 and 2. As illustrated in FIG. 1, a one-side-protected polarizing film 10 (without any transparent resin layer 3) includes, for example, a polarizer 1 and a transparent protective film 2 on only one surface of the polarizer 1. Although not shown, an intervening layer such as an adhesive layer, a pressure-sensitive adhesive layer, or an undercoat layer (primer layer) is provided between the polarizer 1 and the transparent protective film 2 stacked on each other. Although not shown, an adhesion facilitating layer or an activation treatment may be formed or performed on the transparent protective film 2 of the one-side-protected polarizing film 10, and the adhesion facilitating layer and an adhesive layer may be stacked on each other. As illustrated in FIG. 1, the one-side-protected polarizing film 11 of the invention (with a transparent resin layer 3) includes the one-side-protected polarizing film 10 and a transparent resin layer 3 formed from a layer-forming material including a polyvinyl alcohol-based resin, and provided (directly) on one surface of the polarizer 1 (the surface opposite to its surface on which the transparent protective film 2 is provided).

Figure 2A:
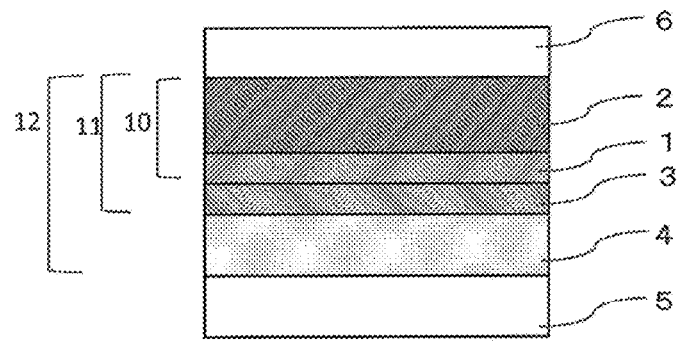
FIGS. 2(A) and 2(B) are schematic cross-sectional views of examples of the pressure-sensitive-adhesive-layer-attached polarizing film of the invention.
Figure 2B:
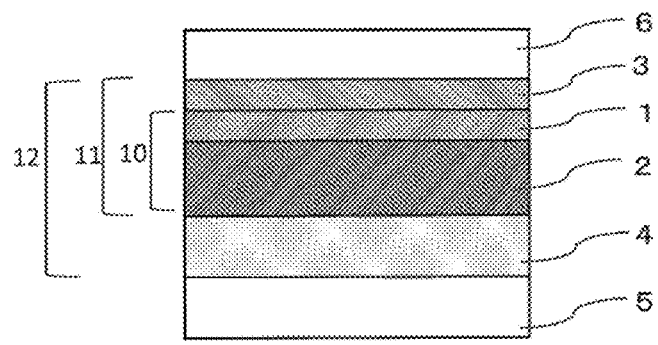

As illustrated in FIGS. 2(A) and 2(B), the pressure-sensitive-adhesive-layer-attached polarizing film 12 of the invention includes the one-side-protected polarizing film 11 (with a transparent resin layer) and a pressure-sensitive adhesive layer 4. The pressure-sensitive adhesive layer 4 may be provided on the transparent resin layer 3 as illustrated in FIG. 2(A) or on the transparent protective film 2 as illustrated in FIG. 2(B). In addition, a separator 5 may be provided on the pressure-sensitive adhesive layer 4 of the pressure-sensitive-adhesive-layer-attached polarizing film 12 of the invention, and a surface protective film 6 may be provided on the opposite side of the film 12 from the separator 5. FIGS. 2(A) and 2(B) show cases where the separator 5 and the surface protective film 6 are both provided on the pressure-sensitive-adhesive-layer-attached polarizing film 12. The pressure-sensitive-adhesive-layer-attached polarizing film 12 provided with at least the separator 5 (and optionally further provided with the surface protective film 6) may be used in the form of a roll. As described below, for example, the roll is advantageously used in a process that includes unwinding the pressure-sensitive-adhesive-layer-attached polarizing film 12 from the roll, feeding the film 12 on the separator 5, and bonding the film 12 to the surface of an image display panel with the pressure-sensitive adhesive layer 4 interposed therebetween (hereinafter, such a method will also be referred to as a "roll-to-panel process", which is typically disclosed in JP-B1-4406043). The pressure-sensitive-adhesive-layer-attached polarizing film preferably has the structure shown in FIG. 2(A), for example, in order to suppress warpage of the display panel after the bonding and to suppress the occurrence of nano-slits. The surface protective film 6 may be provided on the one-side-protected polarizing film 10 and on the one-side-protected polarizing film 11 (with a transparent resin layer).

Figure 3A:
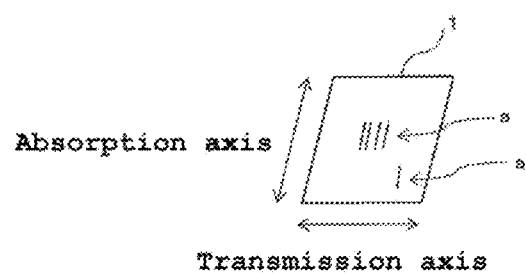
FIGS. 3(A) and 3(B) are exemplary schematic diagrams for a comparison between a nano-slit and a through crack occurring in a polarizer.
Figure 3B:
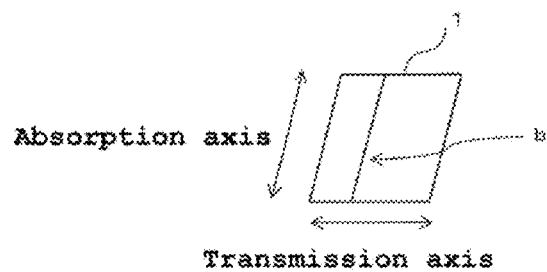

FIGS. 3(A) and 3(B) are schematic diagrams for comparing a nano-slit a and a through crack b, which can occur in the polarizer. FIG. 3(A) shows nano-slits a occurring in the polarizer 1, and FIG. 3(B) shows a through crack b occurring in the polarizer 1. The nano-slits a are caused by mechanical shock and partially occur in the direction of the absorption axis of the polarizer 1. The nano-slits a cannot be observed at the beginning of their formation, but become observable as they expand in the widthwise direction in a hot environment (e.g., at 80° C. or 60° C. and 90% RH). On the other hand, the nano-slits a are not considered to have the ability to progressively extend in the direction of the absorption axis of the polarizer. In addition, the nano-slits a are considered to occur regardless of the size of the polarizing film. Not only a single nano-slit a can occur alone, but also nano-slits a can occur adjacent to one another. On the other hand, the through crack b is caused by thermal shock (e.g., in a heat shock test). The through crack has the ability to progressively extend in the direction of the absorption axis of the polarizer, where the crack occurs. When a through crack b occurs, any other through crack will not occur adjacent thereto because the stress around it is released.

FIGS. 4(A), 4(B), 4(C), 4(D), 4(E) and 4(F) are exemplary photographs of the cross-section of the one-side-protected polarizing film 10 or the transparent resin layer-attached one-side-protected polarizing film 11 for showing the occurrence, expansion, and repair of a nano-slit a in the polarizer. FIG. 4(A) shows an example where no nano-slit occurs in a one-side-protected polarizing film 10 including a polarizer 1 and a transparent protective film 2 on only one surface of the polarizer 1 with an adhesive layer 2a interposed therebetween. FIG. 4(B) shows an example where a nano-slit a occurs in the one-side-protected polarizing film 10. FIGS. 4(A) and 4(B) are both taken before heating. FIG. 4(C) is an exemplary photograph taken after heating of the cross-section of the one-side-protected polarizing film 10 in which a nano-slit a occurs. FIG. 4(C) shows that due to heating, the nano-slit a expands in the polarizer 1. On the other hand, FIG. 4(D) is an exemplary photograph of the cross-section of the transparent resin layer-attached one-side-protected polarizing film 11 obtained by forming a transparent resin layer 3 (1 μm in thickness) on the one-side-protected polarizing film 10 having the nano-slit a. FIG. 4(D) shows that the nano-slit a in the polarizer 1 is repaired (a') by the transparent resin layer 3. FIG. 4(E) is an exemplary photograph of the cross-section taken after heating of the transparent resin layer-attached one-side-protected polarizing film 11 having the transparent resin layer 3 (1 μm in thickness). FIG. 4(E) shows that the repaired nano-slit (a') does not expand after the heating. FIG. 4(F) is an exemplary photograph of the cross-section of another transparent resin layer-attached one-side-protected polarizing film 11' obtained by forming another transparent resin layer 3' (0.1 μm in thickness) on the one-side-protected polarizing film 10 suffering from the nano-slit a. FIG. 4(F) shows that even though the transparent resin layer 3'60 is provided, the nano-slit a in the polarizer 1 expands due to the heating because the transparent resin layer 3' has a smaller thickness. FIGS. 4(A) to 4(F) are each obtained by cutting the cross-section of a sample perpendicularly to the direction of the absorption axis of the sample using a cross-section polisher or a microtome and then observing the cross-section with a scanning electron microscope.

<Polarizer>

In the invention, the polarizer used has a thickness of 10 μm or less. In order to reduce the thickness and suppress the occurrence of through cracks, the thickness of the polarizer is preferably 8 μm or less, more preferably 7 μm or less, even more preferably 6 μm or less. On the other hand, the thickness of the polarizer is preferably 2 μm or more, more preferably 3 μm or more. The polarizer with such a small thickness is less uneven in thickness, has good visibility, and is less dimensionally-variable and thus has high durability to thermal shock.

The polarizer used includes a polyvinyl alcohol-based resin. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride. Among these polarizers, a polarizer including a polyvinyl alcohol-based film and a dichroic material such as iodine is preferred.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

In view of stretching stability and optical durability, the polarizer preferably contains boric acid. In order to suppress the occurrence and expansion of through cracks and nano-slits, the content of boric acid in the polarizer is preferably 25% by weight or less, more preferably 20% by weight or less, even more preferably 18% by weight or less, further more preferably 16% by weight or less, based on the total weight of the polarizer. If the content of boric acid in the polarizer is more than 20% by weight, shrinkage stress in the polarizer can increase to make through cracks more likely to occur even when the thickness of the polarizer is controlled to 10 μm or less, which is not preferred. On the other hand, in view of the stretching stability and optical durability of the polarizer, the boron content is preferably 10% by weight or more, more preferably 12% by weight or more, based on the total weight of the polarizer.

Typical examples of the thin polarizer include the thin polarizers described in, for example, JP-B1-4751486, JP-B1-4751481, JP-B1-4815544, JP-B1-5048120, WO 2014/077599 A, and WO 2014/077636 A or thin polarizers obtained by the production methods described in these publications.

The polarizer is designed to have a single-body transmittance T and a polarization degree P that represent optical properties satisfying the condition of the following formula: $P > -(10^{0.929T-42.4}-1) \times 100$ (provided that T<42.3) or P≥99.9 (provided that T≥42.3). The polarizer designed to satisfy the condition uniquely has the performance required for a liquid crystal television display having a large display element. Specifically, such a display is required to have a contrast ratio of 1,000:1 or more and a maximum brightness of 500 cd/m$^2$ or more. In other applications, for example, the polarizer is bonded to the viewer side of an organic EL display device.

On the other hand, the polarizer designed to satisfy the condition includes a polymer (e.g., a polyvinyl alcohol-based molecule) having high orientation, which causes, together with the thickness of 10 μm or less, a significant reduction in the tensile rupture stress in the direction perpendicular to the absorption axis direction of the polarizer. This increases extremely the possibility that nano-slits may occur in the direction of the absorption axis of the polarizer, for example, when the polarizer is exposed to mechanical shock beyond the tensile rupture stress in the process of producing the polarizing film. Therefore, the invention is particularly suitable for providing a one-side-protected polarizing film including the polarizer described above (or providing a pressure-sensitive-adhesive-layer-attached polarizing film including the polarizer described above).

The thin polarizer described above should be produced by a process capable of achieving high-ratio stretching to improve polarizing performance, among processes including the steps of stretching and dyeing a laminate. From this point of view, the thin polarizer is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

Transparent Protective Film

The transparent protective film is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acryl-based polymers such as polymethyl methacrylate, styrene-based polymers such as polystyrene and acrylonitrile-styrene copolymers (AS resins), and polycarbonate-based polymers. Examples of polymers that may be used to form the transparent protective film also include polyolefin-based polymers such as polyethylene, polypropylene, cyclo- or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene, sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The transparent protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the transparent protective film is preferably from 50 to 100% by weight, more preferably from 50 to 99% by weight, even more preferably from 60 to 98% by weight, further more preferably from 70 to 97% by weight. If the content of the thermoplastic resin in the transparent protective film is 50% by weight or less, high transparency and other properties inherent in the thermoplastic resin may fail to be sufficiently exhibited.

The transparent protective film may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the transparent protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the transparent protective film may be selected as needed. In general, the thickness of the transparent protective film is from about 1 to about 500 μm in view of strength, workability such as handleability, and thin layer formability. In particular, the thickness of the transparent protective film is preferably from 1 to 300 μm, more preferably from 5 to 200 μm, even more preferably from 5 to 150 μm, further more preferably from 20 to 100 μm for thickness reduction.

The surface of the transparent protective film, opposite to its surface where the polarizer is bonded (particularly in the mode shown in FIG. 1), may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the transparent protective film itself or as a layer independent of the transparent protective film.

<Intervening Layer>

The transparent protective film and the polarizer are laminated with an intervening layer, such as an adhesive layer, a pressure-sensitive adhesive layer, or an undercoat layer (primer layer), between them. In this case, the intervening layer should preferably be used to laminate them with no air gap between them.

The adhesive layer is made from an adhesive. Any of various types of adhesives may be used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, a gelatin-based adhesive, a vinyl latex-based adhesive, or a water-based polyester adhesive. The water-based adhesive is generally used in the form of an aqueous solution, which generally has a solids content of 0.5 to 60% by weight.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

For example, when the water-based adhesive is used, the adhesive is preferably applied in such a manner that the finally formed adhesive layer can have a thickness of 30 to 300 nm. The adhesive layer more preferably has a thickness of 60 to 250 nm. On the other hand, when the active energy ray-curable adhesive is used, the adhesive layer is preferably formed with a thickness of 0.1 to 200 μm. The thickness is more preferably from 0.5 to 50 μm, even more preferably from 0.5 to 10 μm.

In the process of laminating the polarizer and the transparent protective film, an adhesion-facilitating layer may be placed between the transparent protective film and the adhesive layer. The adhesion-facilitating layer may be made of, for example, any of various resins having a polyester skeleton, a polyether skeleton, a polycarbonate skeleton, a polyurethane skeleton, a silicone moiety, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

The adhesion-facilitating layer is usually provided in advance on the transparent protective film, and then the adhesion-facilitating layer side of the transparent protective film is bonded to the polarizer with the adhesive layer. The adhesion-facilitating layer can be formed using a known technique that includes applying an adhesion-facilitating-layer-forming material onto the transparent protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 μm, more preferably 0.02 to 2 μm, even more preferably 0.05 to 1 μm. Two or more adhesion-facilitating layers may be provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer and the protective film. The primer layer may be made of any material capable of providing somewhat strong adhesion to both the base film and a polyvinyl alcohol-based resin layer. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture, thereof.

<Transparent Resin Layer>

The transparent resin layer is made from a layer-forming material including a polyvinyl alcohol-based resin. The polyvinyl alcohol-based resin used to form the transparent resin layer may be the same as or different from the polyvinyl alcohol-based resin in the polarizer as long as it falls under the category of "polyvinyl alcohol-based resin."

The transparent resin layer can be formed, for example, by applying the layer-forming material to the polarizer. In the one-side-protected polarizing film having the transparent protective film provided on only one surface of the polarizer, the transparent resin layer is provided on the other surface of the polarizer (the surface opposite to its surface on which the transparent protective film is provided). In some cases, after the one-side-protected polarizing film is bonded to an image display panel, mechanical shock is so applied as to bend the polarizer in a convex shape toward the image display panel side during handling. At this time, the stress concentrating on the top of the convex side of the polarizer can cause the polarizer to crack, which can result in nano-slits. When formed from a layer-forming material including a polyvinyl alcohol-based resin, the transparent resin layer is placed, for example, on the convex side of the polarizer. The transparent resin layer including polyvinyl alcohol with a low boric acid content is less likely to be damaged by stress or bending. Even if stress concentrates on the convex portion of the polarizer, the transparent resin layer formed as described above can relax the stress and thus suppress the occurrence of nano-slits in the polarizer. When a polyvinyl alcohol-based resin is used to form the transparent resin layer, boric acid can partially exude from the polarizer to the transparent resin layer being formed, which can lead to a reduction in the content of boric acid in the polarizer and thus can allow the polarizer itself to resist the occurrence of nano-slits. As described above, when having a thickness of 0.2 µm or more, the transparent resin layer can effectively suppress the occurrence of nano-slits due to handing after the bonding of the polarizing film to an image display panel or any other component. The transparent resin layer preferably has a thickness of 0.5 µm or more, more preferably 0.7 µm or more. On the other hand, if too thick, the transparent resin layer can reduce optical reliability and water resistance. Therefore, the transparent resin layer preferably has a thickness of less than 3 µm, more preferably 2 µm or less. The transparent resin layer can also suppress the occurrence of expansion of nano-slits in the widthwise direction when the polarizing film is placed in a heated environment. Nano-slits formed in the polarizer by mechanical shock tend to expand in the widthwise direction in a heated environment. However, the transparent resin layer made from the layer-forming material including the polyvinyl alcohol-based resin can maintain the ability to withstand mechanical loads even in a hot environment and thus can suppress the expansion of the nano-slits in the widthwise direction.

In addition, the heat of crystal fusion of the transparent resin layer is preferably controlled to 30 mj/mg or more. The transparent resin layer made from a layer-forming material including a water-soluble polyvinyl alcohol-based resin as a main component can have a satisfactory level of moist heat resistance or water resistance when the heat of crystal fusion of the transparent resin layer is controlled to 30 mj/mg or more. The heat of crystal fusion of the transparent resin layer is the value measured based on the description in the EXAMPLES section. The heat of crystal fusion of the transparent resin layer is preferably 40 mj/mg or more, more preferably 50 mj/mg or more. The heat of crystal fusion of the transparent resin layer can be controlled by the type of the polyvinyl alcohol-based resin, the saponification degree of the polyvinyl alcohol-based resin, the polymerization degree of the polyvinyl alcohol-based resin, the curable component that may be used for the layer-forming material (the presence or absence or content of the crosslinking agent or other components), or other conditions.

The polyvinyl alcohol-based resin may be, for example, polyvinyl alcohol. Polyvinyl alcohol can be obtained by saponifying polyvinyl acetate. The polyvinyl alcohol-based resin may also be a product produced by saponifying a copolymer of vinyl acetate and any other monomer or monomers copolymerizable therewith. In this case, when the copolymerizable monomer is ethylene, an ethylene-vinyl alcohol copolymer can be obtained. Examples of the copolymerizable monomer include unsaturated carboxylic acids such as maleic acid (anhydride), fumaric acid, crotonic acid, itaconic acid, and (meth)acrylic acid, and esters thereof; α-olefins such as ethylene and propylene; (sodium) (meth) allylsulfonate, sodium sulfonate (monoalkyl maleate), sodium disulfonate alkyl maleate, N-methylolacrylamide, acrylamide alkyl sulfonate alkali salts, N-vinylpyrrolidone, and N-vinylpyrrolidone derivatives. These polyvinyl alcohol-based resins may be used alone or in combination of two or more. The heat of crystal fusion of the transparent resin layer should be controlled to 30 mj/mg or more so that the transparent resin layer can have a satisfactory level of moist heat resistance or water resistance. From this point of view, the polyvinyl alcohol-based resin is preferably polyvinyl alcohol obtained by saponifying polyvinyl acetate.

The polyvinyl alcohol-based resin to be used may have a saponification degree of, for example, 88% or more, preferably 95% or more. In order to control the heat of crystal fusion of the transparent resin layer to 30 mj/mg or more so that it can have a satisfactory level of moist heat resistance or water resistance, the polyvinyl alcohol-based resin preferably has a saponification degree of 99% or more, more preferably 99.7% or more. The saponification degree indicates the proportion of the units actually saponified to vinyl alcohol units in the units capable of being converted to vinyl alcohol units by saponification, after which vinyl ester units can remain as residues. The saponification degree can be determined according to JIS K 6726-1994.

The polyvinyl alcohol-based resin to be used may have an average degree of polymerization of, for example, 500 or more. In order to control the heat of crystal fusion of the transparent resin layer to 30 mj/mg or more so that it can have a satisfactory level of moist heat resistance or water resistance, the polyvinyl alcohol-based resin preferably has an average degree of polymerization of 1,000 or more, more preferably 1,500 or more, even more preferably 2,000 or more. The average degree of polymerization of the polyvinyl alcohol-based resin can be measured according to JIS K 6726.

The polyvinyl alcohol-based resin to be used may also be a modified polyvinyl alcohol-based resin having a hydrophilic functional group on the side chain of the polyvinyl alcohol or copolymerized polyvinyl alcohol. The hydrophilic functional group may be, for example, an acetoacetyl group or a carbonyl group. Other examples of the polyvinyl alcohol-based resin that may be used include modified polyvinyl alcohols obtained by, for example, actualization, urethanation, etherification, or phosphorylation of polyvinyl alcohol-based resin or grafting on polyvinyl alcohol-based resin.

In the invention, the layer-forming material including the polyvinyl alcohol-based resin as a main component, which is used to form the transparent resin layer, may contain a curable component (crosslinking agent) or other components. The content of the polyvinyl alcohol-based resin in the transparent resin layer or the layer-forming material (solid basis) is preferably 80% by weight or more, more preferably 90% by weight or more, even more preferably 95% by weight or more. In order to make it easy to control the heat of crystal fusion of the transparent resin layer to 30 mj/mg or more, the layer-forming material is preferably free of any curable component (crosslinking agent).

A compound having at least two functional groups reactive with the polyvinyl alcohol-based resin may be used as the crosslinking agent. Examples of such a compound include alkylenediamines having an alkylene group and two amino groups, such as ethylenediamine, triethylenediamine, and hexamethylenediamine; isocyanates such as tolylene diisocyanate, hydrogenated tolylene diisocyanate, trimethylolpropane tolylene diisocyanate adducts, triphenylmethane triisocyanate, methylene bis(4-phenylmethanetriisocyanate, isophorone diisocyanate, and ketoxime blocked compounds thereof or phenol blocked compounds thereof; epoxies such as ethylene glycol diglycidyl ether, polyethylene glycol diglycidyl ether, glycerin di- or triglycidyl ether, 1,6-hexanediol diglycidyl ether, trimethylolpropane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; amino-formaldehyde resins such as condensates of formaldehyde with methylolurea, methylolmelamine, alkylated methylolurea, alkylated methylolmelamine, acetoguanamine, or benzoguanamine; dicarbozylic acid dihydrazides such as adipic acid dihydrazide, ozalic acid dihydrazide, malonic acid dihydrazide, succinic acid dihydrazide, glutaric acid dihydrazide, isophthalic acid dihydrazide, sebacic acid dihydrazide, maleic acid dihydrazide, fumaric acid dihydrazide, and itaconic acid dihydrazide; and water-soluble dihydrazines such as ethylene-1,2-dihydrazine, propylene-1,3-dihydrazine, and butylene-1,4-dihydrazine. Among them, amino-formaldehyde resins and water-soluble dihydrazines are preferred. The amino-formaldehyde resins are preferably methylol group-containing compounds. Methylolmelamine is particularly preferred among the methylol group-containing compounds.

The curable component (crosslinking agent) may be used to improve water resistance, in which the content of the curable component (crosslinking agent) is preferably 20 parts by weight or less, 10 parts by weight or less, or 5 parts by weight or less, based on 100 parts by weight of the polyvinyl alcohol-based resin.

The layer-forming material may be prepared as a solution by dissolving the polyvinyl alcohol-based resin in a solvent. Examples of the solvent include water, dimethyl sulfoxide, dimethylformamide, dimethylacetamide, N-methylpyrrolidone, various glycols, alcohols, and amines such as ethylenediamine and diethylenetriamine. These solvents may be used alone or in combination of two or more. Among them, water is preferably used as the solvent to form the layer-forming material, as an aqueous solution. The concentration of the polyvinyl alcohol-based resin in the layer-forming material (e.g., an aqueous solution) may be, but not limited to, 0.1 to 15% by weight, preferably 0.5 to 10% by weight, in view of coatability, shelf stability, and other properties.

The layer-forming material (e.g., an aqueous solution) may contain an additive such as a plasticizer or a surfactant. The plasticizer may be, for example, a polyhydric alcohol such as ethylene glycol or glycerin. The surfactant may be, for example, a nonionic surfactant. The layer-forming material may also contain a coupling agent such as a silane coupling agent or a titanium coupling agent, any of various tackifiers, an ultraviolet absorber, an antioxidant, and a stabilizer such as a heat-resistant stabilizer or a hydrolysis-resistant stabilizer.

The transparent resin layer can be formed by applying the layer-forming material to the other surface of the polarizer (the surface opposite to its surface on which the transparent protective film is placed) and drying the material. The layer-forming material should be applied in such a manner that a coating with a thickness of 0.2 µm or more can be formed after drying. The application process is not limited, and any appropriate method may be used in the application process. For example, roll coating, spin coating, wire bar coating, dip coating, die coating, curtain coating, spray coating, knife coating, (such as comma coating), or various other methods may be used.

<Pressure-Sensitive Adhesive Layer>

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties, such as cohesiveness and adhesiveness are preferably used. An acryl-based pressure-sensitive adhesive is preferably used because it has such properties.

The pressure-sensitive adhesive layer can be formed by a method including applying the pressure-sensitive adhesive to a release-treated separator or other means, removing the polymerization solvent and other components from the adhesive by drying to form a pressure-sensitive adhesive layer, and then transferring the pressure-sensitive adhesive layer onto the polarizer in the embodiment of FIG. 2(A) for onto the transparent protective film in the embodiment of FIG. 2(B)). Alternatively, the pressure-sensitive adhesive layer can be formed by a method including applying the pressure-sensitive adhesive to the polarizer in the embodiment of FIG. 2(A) (or to the transparent protective film in the embodiment of FIG. 2(B)) and removing the polymerization solvent and other components from the adhesive by drying to form a pressure-sensitive adhesive layer on the polarizer. In the process of applying the pressure-sensitive adhesive, if necessary, one or more solvents other than the polymerization solvent may be newly added to the adhesive.

A silicone release liner is preferably used, as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form, the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

The thickness of the pressure-sensitive adhesive layer is typically, but not limited to, about 1 to about 100 μm, preferably 2 to 50 μm, more preferably 2 to 40 μm, even more preferably 5 to 35 μm.

When the pressure-sensitive adhesive layer is exposed, the pressure-sensitive adhesive layer may be protected by a release-treated sheet (separator) until it is actually used.

Examples of the material used to form, such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 μm, preferably about 5 to about 100 μm. If necessary, the separator may be subjected to a release treatment, and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment, such as a silicone treatment, a long-chain alkyl treatment, or a fluorine treatment, the releasability from the pressure-sensitive adhesive layer can be further improved.

<Surface Protective Film>

A surface protective film may be provided on the one-side-protected polarizing film or the pressure-sensitive-adhesive-layer-attached polarizing film. The surface protective film generally has a base film and a pressure-sensitive adhesive layer. The surface protective film protects the polarizer with the pressure-sensitive adhesive layer interposed between them.

In view of the ability to be tested or managed, an isotropic or nearly-isotropic film material should be selected as the base film for the surface protective film. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. In particular, polyester-based resins are preferred. The base film may be made of a single film material or a laminate of two or more film materials. The base film may also be a product obtained by stretching the film. The base film generally has a thickness of 500 μm or less, preferably 10 to 200 μm.

The pressure-sensitive adhesive used to form the pressure-sensitive adhesive layer for the surface protective film may be appropriately selected from pressure-sensitive adhesives including, as a base polymer, a (meth)acryl-based polymer, a silicone-based polymer, polyester, polyurethane, polyamide, polyether, fluoride-based polymer, rubber-based polymer, or any other polymer. An acryl-based pressure-sensitive adhesive containing an acryl-based polymer as a base polymer is preferred in view of transparency, weather resistance, heat resistance, and other properties. The thickness, (dry thickness) of the pressure-sensitive adhesive layer is selected depending on the desired adhesive strength. The thickness of the pressure-sensitive adhesive is generally from about 1 to about 100 μm, preferably from 5 to 50 μm.

A silicone, long-chain alkyl, or fluorine treatment with a low-adhesion material may also be performed to form a release treatment layer on the surface of the base film of the surface protective film, opposite to its surface on which the pressure-sensitive adhesive layer is provided.

<Other Optical Layers>

For practical use, the one-side-protected polarizing film of the invention or the pressure-sensitive-adhesive-layer-attached polarizing film of the invention may be laminated with any other optical layer or layers to form an optical film. As a non-limiting example, such an optical layer or layers may be one or more optical layers that have ever been used to form liquid crystal display devices or other devices, such as a reflector, a transflector, a retardation plate (including a wavelength plate such as a half or quarter wavelength plate), or a viewing angle compensation film. Particularly preferred is a reflective or transflective polarizing film including a laminate of the one-side-protected polarizing film of the invention and a reflector or a transflector, an elliptically or circularly polarizing film including a laminate of the polarizing film of the invention and a retardation plate, a wide viewing angle polarizing film including a laminate of the polarizing film of the invention and a viewing angle compensation film, or a polarizing film including a laminate of the polarizing film of the invention and a brightness enhancement film.

The optical film including a laminate of the above optical layer and the one-side-protected polarizing film or the pressure-sensitive-adhesive-layer-attached polarizing film may be formed by a method of stacking them one by one, for example, in the process of manufacturing a liquid crystal display device. However, the optical film should be formed by stacking them in advance, which is superior in quality stability or assembling workability and thus advantageous in facilitating the process of manufacturing liquid crystal display devices or other devices. In the lamination, any appropriate bonding means such as a pressure-sensitive adhesive layer may be used. When the pressure-sensitive-adhesive-layer-attached polarizing film and any other optical film are bonded together, their optical axes may be each aligned at an appropriate angle, depending on the desired retardation properties or other desired properties.

The one-side-protected polarizing film, the pressure-sensitive-adhesive-layer-attached polarizing film, or the optical film according to the invention is preferably used to form various image display devices such as liquid crystal display devices and organic EL display devices. Liquid crystal display devices may be formed according to conventional techniques. Specifically, a liquid crystal display device may be typically formed according to any conventional techniques by appropriately assembling a liquid crystal cell, pressure-sensitive-adhesive-layer-attached polarizing films or optical films, and optional components such as a lighting system, incorporating a driving circuit, and performing other processes, except that the one-side-protected polarizing film, the pressure-sensitive-adhesive-layer-attached polarizing film, or the optical film according to the invention is used. The liquid crystal cell to be used may also be of any type, such as IPS type or VA type. The invention is particularly suitable for IPS type.

Any desired liquid crystal display device may be formed, such as a liquid crystal display device including a liquid crystal cell and the one-side-protected polarizing film or films, the pressure-sensitive-adhesive-layer-attached polarizing film or films, or the optical film or films placed on one or both sides of the liquid crystal cell, or a liquid crystal display device further including a backlight or a reflector in the lighting system. In such a case, the pressure-sensitive-adhesive-layer-attached polarizing film or films or the optical film or films according to the invention may be placed on one or both sides of the liquid crystal cell. When the one-side-protected polarizing films, the pressure-sensitive-adhesive-layer-attached polarizing films, or the optical films are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

<Method for Continuously Producing Image Display Device>

The image display device described above is preferably produced by a continuous production method (roll-to-panel process) including the steps of: unwinding the pressure-sensitive-adhesive-layer-attached polarizing film of the invention from a roll thereof; feeding the pressure-sensitive-adhesive-layer-attached polarizing film with the separator; and continuously bonding the pressure-sensitive-adhesive-layer-attached polarizing film to the surface of an image display panel with the pressure-sensitive adhesive layer interposed therebetween. The pressure-sensitive-adhesive-layer-attached polarizing film of the invention is a very thin film. Therefore, if the pressure-sensitive-adhesive-layer-attached polarizing film of the invention is subjected to a process that includes cutting the film into sheet pieces (cut pieces) and then bonding the pieces one by one to image display panels (also referred to as a "sheet-to-panel process"), the sheets will be difficult to feed or handle during the bonding of them to the display panels, so that the risk for the pressure-sensitive-adhesive-layer-attached polarizing films (sheets) to undergo high mechanical shock (such as suction-induced bending) will increase during these processes. In order to reduce the risk, other measures should be taken, such as using a relatively thick surface protective film including a base film with a thickness of 50 µm or more. In contrast, the roll-to-panel process allows the pressure-sensitive-adhesive-layer-attached polarizing film to be stably fed from the roll to the image display panel with the aid of the separator, without cutting the film into sheet pieces (cut pieces), and also allows the film to be directly bonded to the image display panel, which makes it possible to significantly reduce the risk without using a relatively thick surface protective film. This allows high-speed continuous production of image display devices so as to effectively suppress not only defects which would otherwise be caused by the occurrence of nano-slits before the formation of the transparent resin layer but also defects which would otherwise be caused by the occurrence of nano-slits after the formation of the transparent resin layer.

Figure 9:
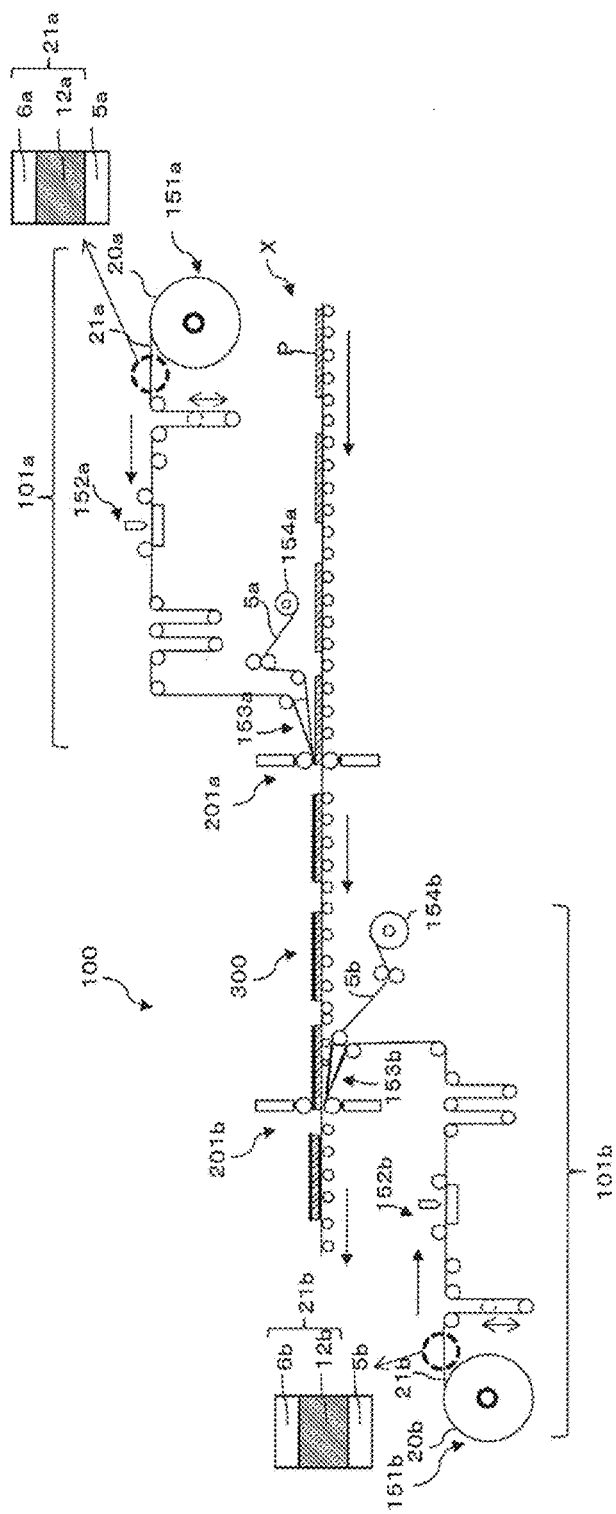
FIG. 9 is a schematic cross-sectional view of an example of a system for continuously producing image display devices.

FIG. 9 is a schematic diagram illustrating an example of a system for continuously producing liquid crystal devices using the roll-to-panel process.

As illustrated in FIG. 9, a system 100 for continuously producing liquid crystal display devices includes a continuous feed unit X configured to feed liquid crystal display panels P, a first polarizing film supply unit 101a, a first bonding unit 201a, a second polarizing film supply unit 101b, and a second bonding unit 201b.

In this case, a roll 20a of a first pressure-sensitive-adhesive-layer-attached polarizing film (a first roll) and a roll 20b of a second pressure-sensitive-adhesive-layer-attached polarizing film (a second roll) are used, in which the films each have an absorption axis in the longitudinal direction and each have the structure shown in FIG. 2(A).

(Feed Unit)

The feed unit X is configured to feed liquid crystal display panels P. The feed unit X includes a plurality of feed rollers, suction plates, and other components. The feed unit X includes an orientation changing unit 300 that is provided between the first and second bonding units 201a and 201b and configured to interchange the positional relationship between the long and short sides of the liquid crystal panel P with respect to the direction of the feed of the liquid crystal display panel P (e.g., by horizontally turning the liquid crystal display panel P by 90°). This allows the first and second pressure-sensitive-adhesive-layer-attached polarizing films 21a and 21b to be bonded in a cross-Nicols relationship to the liquid crystal display panel P.

(First Polarizing Film Supply Unit)

The first polarizing film supply unit 101a is configured to unwind the first pressure-sensitive-adhesive-layer-attached polarizing film 21a (with a surface protective film) from the first roll 20a, feed the film 21a with the separator 5a, and continuously supply the film 21a to the first bonding unit 201a. The first polarizing film supply unit 101a includes a first unwinding unit 151a, a first cutting unit 152a, a first peeling unit 153a, a first winding unit 154a, a plurality of feed roller units, an accumulator unit including dancer rolls, and other components.

The first unwinding unit 151a has an unwinding shaft on which the first roll 20a is placed, and is configured to unwind, from the first roll 20a, the long, pressure-sensitive-adhesive-layer-attached, polarizing film 21a provided with the separator 5a.

The first cutting unit 152a includes cutting means such as a cutter or a laser and suction means. The first cutting unit 152a is configured to form a piece with a predetermined length by transversely cutting the first long pressure-sensitive-adhesive-layer-attached polarizing film 21a and leaving the separator 5a uncut. Alternatively, the first roll 20a may be a roll of a laminate of the separator 5a and the long pressure-sensitive-adhesive-layer-attached polarizing film with a plurality of score lines formed in the widthwise direction at predetermined intervals (a scored optical film roll). In this case, the first cutting unit 152a is unnecessary (this also applies to the second cutting unit 152b described below).

The first peeling unit 153a is configured to peel off the first pressure-sensitive-adhesive-layer-attached polarizing film 21a from the separator 5a by inwardly folding back the separator 5a. The first peeling unit 153a may include a wedge-shaped member, rollers, and other components.

The first winding unit 154a is configured to wind the separator 5a from which the first pressure-sensitive-adhesive-layer-attached polarizing film 21a has been peeled off. The first winding unit 154a has a winding shaft on which a roll for winding the separator 5a is placed.

(First Bonding Unit)

The first bonding unit 201a is configured to continuously bond the first, pressure-sensitive-adhesive-layer-attached polarizing film 21a, which has been peeled off by the first peeling unit 153a, to the liquid crystal display panel P, which is being fed by the feed unit X, with the pressure-sensitive adhesive layer of the first pressure-sensitive-adhesive-layer-attached polarizing film 21a interposed therebetween (first bonding step). The first bonding unit 81 includes a pair of bonding rollers, at least one of which includes a drive roller.

(Second Polarizing Film Supply Unit)

The second polarizing film supply unit 101b is configured to unwind the second pressure-sensitive-adhesive-layer-attached polarizing film 21b (with a surface protective film) from the second roll 20b, feed the film 21b with the separator 5b, and continuously supply the film 21b to the second bonding unit 201b. The second polarizing film supply unit 101b includes a second unwinding unit 151b, a second cutting unit 152b, a second peeling unit 153b, a second winding unit 154b, a plurality of feed roller units, an accumulator unit including dancer rolls, and other components. The second unwinding unit 151b, the second cutting unit 152b, the second peeling unit 153b, and the second winding unit 154b have the same structures and functions as those of the first unwinding unit 151a, the first cutting unit 152a, the first peeling unit 153a, and the first winding unit 154a, respectively.

(Second Bonding Unit)

The second bonding unit 201b is configured to continuously bond the second pressure-sensitive-adhesive-layer-attached polarizing film 21b, which has been peeled off by the second peeling unit 153b, to the liquid crystal display panel P, which is being fed by the feed unit X, with the pressure-sensitive adhesive layer of the second pressure-sensitive-adhesive-layer-attached polarizing film 21b interposed therebetween (second bonding step). The second bonding unit 201b includes a pair of bonding rollers, at least one of which includes a drive roller.

EXAMPLES

Hereinafter, the invention will fee more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

<One-Side-Protected Polarizing Film A>

(Preparation of Polarizer A0)

A corona treatment was performed on one surface of an amorphous isophthalic acid-copolymerized polyethylene terephthalate (IPA-copolymerized PET) film substrate (100 μm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizing plate to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by weight of water) at a temperature of 30° C. (crosslinking).

The laminate was then uniaxially stretched to a total stretch ratio or 5.5 times in the longitudinal direction between rolls at different peripheral speeds while it was immersed in an aqueous boric acid solution (an aqueous solution obtained by adding 4 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 30° C. (cleaning).

The resulting product was an optical film laminate including a 5-μm-thick polarizer.

(Preparation of Polarizers A1 to A8)

Polarizers A1 to A8 were prepared similarly to the preparation of polarizer A0 described above, except that the preparation conditions were changed as shown in Table 1. Table 1 also shows the thicknesses, optical properties (single-body transmittance and polarization degree), and boric acid concentrations of polarizers A1 to A8.

TABLE 1

| | Polarizer | | | | PNA-based resin layer thickness (μm) | Auxiliary in-air stretching ratio | Dyeing bath | | | In-water stretching bath | | | | Cleaning bath |
| | Thickness (μm) | Single-body Transmittance T (%) | Polarization degree P (%) | Boric acid content (wt %) | | | Iodine content (wt parts) | Potassium iodide content (wt parts) | Immersion time | Boric acid | Potassium iodide content (wt parts) | Stretching ratio | Total stretch ratio | Potassium iodide content (wt parts) |
|---|---|---|---|---|---|---|---|---|---|---|---|---|---|---|
| Polarizer A0 | 5 | 42.8 | 99.99 | 16 | 11 μm | 2.0 times | 0.2 parts | 1.0 parts | 60 seconds | 4.0 parts | 5 parts | 2.75 times | 5.5 times | 4 parts |
| Polarizer A1 | 5 | 42.8 | 99.99 | 14 | 11 μm | 2.0 times | 0.2 parts | 1.0 parts | 60 seconds | 3.5 parts | 5 parts | 2.75 times | 5.5 times | 4 parts |
| Polarizer A2 | 5 | 42.8 | 99.99 | 18 | 11 μm | 2.0 times | 0.2 parts | 1.0 parts | 60 seconds | 4.2 parts | 5 parts | 2.75 times | 5.5 times | 4 parts |
| Polarizer A3 | 5 | 42.8 | 99.99 | 20 | 11 μm | 2.0 times | 0.2 parts | 1.0 parts | 60 seconds | 4.5 parts | 5 parts | 2.75 times | 5.5 times | 4 parts |
| Polarizer A4 | 3 | 42.8 | 99.99 | 16 | 7 μm | 2.0 times | 0.2 parts | 1.0 parts | 60 seconds | 4.0 parts | 5 parts | 2.75 times | 5.5 times | 4 parts |
| Polarizer A5 | 7 | 42.8 | 99.99 | 16 | 15 μm | 2.0 times | 0.2 parts | 1.0 parts | 60 seconds | 4.0 parts | 5 parts | 2.75 times | 5.5 times | 4 parts |
| Polarizer A6 | 5 | 44.1 | 99.99 | 16 | 11 μm | 2.0 times | 0.2 parts | 1.0 parts | 50 seconds | 4.0 parts | 5 parts | 2.75 times | 5.5 times | 4 parts |
| Polarizer A7 | 5 | 41.5 | 99.99 | 16 | 11 μm | 2.0 times | 0.2 parts | 1.0 parts | 90 seconds | 4.0 parts | 5 parts | 2.75 times | 5.5 times | 4 parts |
| Polarizer A8 | 3.5 | 43.2 | 99.15 | 16 | 7 μm | 4.0 times | 0.2 parts | 1.0 parts | 60 seconds | 3 parts | 3 parts | Not stretched | 4.0 times | 4 parts |

(Preparation of Transparent Protective Film)

The adhesion facilitation-treated surface of a lactone ring structure-containing (meth)acrylic-resin film with a thickness of 40 μm was subjected to a corona treatment. The corona-treated film was used as a transparent protective film.

(Preparation of Adhesive to be Applied to Transparent Protective Film)

An ultraviolet-curable adhesive was prepared by mixing 40 parts by weight of N-hydroxyethylacrylamide (HEAA), 60 parts by weight of acryloylmorpholine (ACMO), and 3 parts by weight of a photo-initiator IRGACURE 819 (manufactured by BASF).

(Preparation of One-Side-Protected Polarizing Films A)

The transparent protective film was bonded to the surface of each of polarizers A0 to A8 of the optical film laminates with the ultraviolet-curable adhesive being applied to the surface in such a manner as to form a 0.5-μm-thick adhesive layer after curing. Subsequently, the adhesive was cured by applying ultraviolet rays as active energy rays. The ultraviolet rays were applied using the following conditions: gallium-containing metal halide lamp; irradiator, Light Hammer 10 manufactured by Fusion UV Systems, Inc; valve, V valve; peak illuminance, 1,600 mW/cm$^2$; total dose, 1,000/mJ/cm$^2$ (wavelength 380-440 nm). The illuminance of the ultraviolet rays was measured with Sola-Check System manufactured by Solatell Ltd. Subsequently, the amorphous PET substrate was removed from each product, so that one-side-protected polarizing films A0 to A8 each having the thin polarizer were obtained. Table 2 shows the optical properties (single-body transmittance and polarization degree) of resulting one-side-protected polarizing films A0 to A8.

<One-Side-Protected Polarizing Film B>

(Preparation of Polarizer B (23-μm-Thick Polarizer))

A 75-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer (23 μm in thickness).

(Preparation of One-Side-Protected Polarizing Film B)

Similarly to the preparation of one-side-protected polarizing film A, the transparent protective film shown above was bonded to one surface of the PVA-based polarizer with the ultraviolet-curable adhesive shown above. The optical properties of resulting one-side-protected film B were as follows: transmittance 42.8%, polarization degree 99.99%.

<One-Side-Protected Polarizing Film C>

(Preparation of Polarizer C)

A corona treatment was performed on one surface of an amorphous isophthalic acid-copolymerized polyethylene terephthalate (IPA-copolymerized PET) film substrate (130 μm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

Using a simultaneous biaxial stretching machine, the resulting laminate was shrunk at 110° C. in a first direction (MD) by 30% and simultaneously stretched in a second direction (TD) to 5.0 times in the air (stretching).

Subsequently, the laminate was immersed in an aqueous iodine solution (iodine concentration: 0.2% by weight, potassium iodide concentration: 1.4% by weight) at 25° C. for 40 seconds (dyeing).

The dyed laminate was immersed in an aqueous boric acid solution (boric acid concentration: 5% by weight, potassium iodide concentration: 5% by weight) at 60° C. for 80 seconds (crosslinking).

After the crosslinking, the laminate was immersed in an aqueous potassium iodide solution (potassium iodide concentration: 5% by weight) at 25° C. for 20 seconds (cleaning).

The resulting product was an optical film laminate including a 3-μm-thick polarizer.

(Preparation of One-Side-Protected Polarizing Film)

A protective film (Z-TAC ZRD40SL (trade name) manufactured by FUJI FILM Corporation, 40 μm in thickness) was bonded to the polarizer side of the laminate with a vinyl alcohol-based adhesive. Subsequently, the amorphous PET substrate was removed, so that one-side-protected polarizing film C having the thin polarizer was obtained. The optical properties of resulting one-side-protected film C were as follows: transmittance 38.4%, polarization degree 99.99%.

<One-Side-Protected Polarizing Film D>

(Preparation of Polarizer D (12-μm-Thick Polarizer))

A 30-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer. The resulting polarizer was 12 μm in thickness.

(Preparation of One-Side-Protected Polarizing Film D)

Similarly to the preparation of one-side-protected polarizing film A, the transparent protective film shown above was bonded to one surface of the PVA-based polarizer with the ultraviolet-curable adhesive shown above. The optical properties of resulting one-side-protected film D were as follows: transmittance 42.8%, polarization degree 99.99%.

<Transparent Resin Layer-Forming Material>

(Polyvinyl Alcohol-Based, Layer-Forming Material A)

An aqueous solution with a solid concentration of 4% by weight was prepared by dissolving a polyvinyl alcohol resin with a polymerization degree of 2,500 and a saponification degree of 99.0 mol % (JC-25 (trade name) manufactured by JAPAN VAM & POVAL CO., LTD.) in pure water.

(Polyvinyl Alcohol-Based, Layer-Forming Material B)

An aqueous solution with a solid concentration of 4% by weight was prepared by dissolving a polyvinyl alcohol resin with a polymerization degree of 2,500 and a saponification degree of 99.7 mol % (JC-25H (trade name) manufactured by JAPAN VAM & POVAL CO., LTD.) in pure water.

(Polyvinyl Alcohol-Based, Layer-Forming Material C)

An aqueous solution with a solid concentration of 4% by weight was prepared by dissolving a polyvinyl alcohol resin with a polymerization degree of 1,700 and a saponification degree of 99.0 mol % (JC-17 (trade name) manufactured by JAPAN VAM & POVAL CO., LTD.) in pure water.

(Polyvinyl Alcohol-Based, Layer-Forming Material D)

An aqueous solution with a solid concentration of by weight was prepared by dissolving a polyvinyl alcohol resin with a polymerization degree of 1,000 and a saponification degree of 99.0 mol % (JC-10 (trade name) manufactured by JAPAN VAM & POVAL CO., LTD.) in pure water.

(Polyvinyl Alcohol-Based, Layer-Forming Material E)

An aqueous solution with a solid concentration of 4% by weight was prepared by dissolving a polyvinyl alcohol resin, with a polymerization degree of 500 and a saponification degree of 99.0 mol % (JC-05 (trade name) manufactured by JAPAN VAM & POVAL CO., LTD.) in pure water.

(Polyvinyl Alcohol-Based, Layer-Forming Material F)

An aqueous solution with a solid concentration of 4% by weight was prepared by dissolving a polyvinyl alcohol resin with a polymerization degree of 2,500 and a saponification degree of 98.0 mol % (JF-2500 (trade name) manufactured by JAPAN VAM & POVAL CO., LTD.) in pure water.

(Polyvinyl Alcohol-Based, Layer-Forming Material G)

An aqueous solution with a solid concentration of 4% by weight was prepared by dissolving a polyvinyl alcohol resin with a polymerization degree of 2,500 and a saponification degree of 96.0 mol % (JM-2500 (trade name) manufactured by JAPAN VAM & POVAL CO., LTD.) in pure water.

(Polyvinyl Alcohol-Based, Layer-Forming Material H)

An aqueous solution with a solid concentration of 4% by weight was prepared by dissolving an acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0 mol % in saponification degree) in pure water.

(Polyvinyl Alcohol-Based, Layer-Forming Material I)

An aqueous solution with a solid concentration of 4% by weight was prepared by dissolving 100 parts of an acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0 mol % in saponification degree) and 5 parts of methylolmelamine (WATERSOL S-695 (trade name) manufactured by DIC Corporation) in pure water.

(Polyvinyl Alcohol-Based, Layer-Forming Material J)

An aqueous solution with a solid concentration of 4% by weight was prepared by dissolving 100 parts of an acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0 mol % in saponification degree) and 20 parts of methylolmelamine (WATERSOL S-695 (trade name) manufactured by DIC Corporation) in pure water.

(Polyvinyl Alcohol-Based, Layer-Forming Material K)

An aqueous solution with a solid concentration of 4% by weight was prepared by dissolving carbonyl-modified polyvinyl alcohol resin (DC-17 (trade name) manufactured by JAPAN VAM & POVAL CO., LTD.) in pure water.

(Polyvinyl Alcohol-Based, Layer-Forming Material L)

An aqueous solution with a solid concentration of 4% by weight was prepared by dissolving 100 parts of a carbonyl-modified polyvinyl alcohol resin (DC-17 (trade name) manufactured by JAPAN VAM & POVAL CO., LTD.) and 10 parts of a dihydrazine (adipic acid dihydrazide) in pure water.

(Polyvinyl Alcohol-Based, Layer-Forming Material M)

An aqueous solution with a solid concentration of 4% by weight was prepared by dissolving a polyvinyl alcohol resin with a polymerization degree of 2,000 and a saponification degree of 99.4 mol % (NH-20 (trade name) manufactured by The Nippon Synthetic Chemical Industry Co., Ltd.) in pure water.

(Polyvinyl Alcohol-Based, Layer-Forming Material N)

An aqueous solution with a solid concentration of 4% by weight was prepared by dissolving a polyvinyl alcohol resin with a polymerization degree of 1,700 and a saponification degree of 97.0 mol % (AH-17 (trade name) manufactured by The Nippon Synthetic Chemical Industry Co., Ltd.) in pure water.

(Polyvinyl Alcohol-Based, Layer-Forming Material O)

An aqueous solution with a solid concentration of 4% by weight was prepared by dissolving a polyvinyl alcohol resin with a polymerization degree of 1,700 and a saponification degree of 99.0 mol % (PVA117 (trade name) manufactured by KURARAY CO., LTD.) in pure water.

(Polyvinyl Alcohol-Based, Layer-Forming Material P)

An aqueous solution with a solid concentration of 4% by weight was prepared by dissolving a polyvinyl alcohol resin with a polymerization degree of 4,000 and a saponification degree of 99.0 mol % (JC-40 (trade name) manufactured by JAPAN VAM & POVAL CO., LTD.) in pure water.

(Polyvinyl Alcohol-Based, Layer-Forming Material Q)

An aqueous solution with a solid concentration of 4% by weight was prepared by dissolving a polyvinyl alcohol resin with a polymerization degree of 1,700 and a saponification degree of 96.0 mol % (JM-17 (trade name) manufactured by JAPAN VAM & POVAL CO., LTD.) in pure water.

(Polyvinyl Alcohol-Based, Layer-Forming Material R)

An aqueous solution with a solid concentration of 4% by weight was prepared by dissolving a polyvinyl alcohol resin with a polymerization degree of 1,400 and a saponification degree of 88.0 mol % (GM-14 (trade name) manufactured by The Nippon Synthetic Chemical Industry Co., Ltd.) in pure water.

(Polyvinyl Alcohol-Based, Layer-Forming Material S)

An aqueous solution with a solid concentration of 4% by weight was prepared by dissolving a polyvinyl alcohol resin with a polymerization degree of 1,300 and a saponification degree of 93.0 mol % (PVA613 (trade name) manufactured by KURARAY CO., LTD.) in pure water.

(Polyvinyl Alcohol-Based, Layer-Forming Material T)

An aqueous solution with a solid concentration of 4% by weight was prepared by dissolving a polyvinyl alcohol resin with a polymerization degree of 1,700 and a saponification degree of 94.5 mol % (PVA617 (tradename) manufactured by KURARAY CO., LTD.) in pure water.

(Polyvinyl Alcohol-Based, Layer-Forming Material D)

An aqueous solution with a solid concentration of by weight was prepared by dissolving a polyvinyl alcohol resin with a polymerization degree of 3,300 and a saponification degree of 94.0 mol % (JM-33 (trade name) manufactured by JAPAN VAM & POVAL CO., LTD.) in pure water.

(Polyvinyl Alcohol-Based, Layer-Forming Material V)

An aqueous solution with a solid concentration of 4% by weight was prepared by dissolving a polyvinyl alcohol resin, with a polymerization degree of 500 and a saponification degree of 94.5 mol % (JT-05 (trade name) manufactured by JAPAN VAM & POVAL CO., LTD.) in pure water.

<Formulation of Pressure-Sensitive Adhesive Layer>

A reaction vessel equipped with a condenser tube, a nitrogen inlet tube, a thermometer, and a stirrer was charged with 100 parts of butyl acrylate, 3 parts of acrylic acid, 0.1 parts of 2-hydroxyethyl acrylate, 0.3 parts of 2,2'-azobisisobutyronitrile, and ethyl acetate, so that a solution was obtained. Subsequently, the solution was allowed to react at 55° C. for 8 hours under stirring with nitrogen gas being blown into the solution, so that a solution containing an acryl-based polymer with a weight average molecular weight of 2,200,000 was obtained. Ethyl acetate was further added to the acryl-based polymer-containing solution to form an acryl-based polymer solution with an adjusted solid concentration of 30%.

A pressure-sensitive adhesive solution was prepared by adding 0.5 parts of a crosslinking agent (CORONATE L (trade name) manufactured by Nippon Polyurethane Industry Co., Ltd.) including an isocyanate group-containing compound as a main component and 0.075 parts of γ-glycidoxypropyltrimethoxysilane (KBM-403 (trade name) manufactured by Shin-Etsu Chemical Co., Ltd.) as a silane coupling agent in this order to the acryl-based polymer solution based on 100 parts of the solids of the acryl-based polymer solution. The pressure-sensitive adhesive solution was applied to the surface of a release sheet (separator) made of a release-treated polyethylene terephthalate film (38 μm in thickness) in such a manner that a 25-μm-thick coating could be formed after drying, and then dried to form a pressure-sensitive adhesive layer.

Example 1

<Preparation of Transparent Resin Layer-Attached, One-Side-Protected Polarizing Films>

Using a wire bar coater, layer-forming material A (shown above) adjusted to 25° C. was applied to the polarizer surface of one-side-protected polarizing film A shown above (the surface of the polarizer opposite to its surface provided with the transparent protective film) in such a manner that a 1-μm-thick coating could be formed after drying, and then dried with hot air at 60° C. for 1 minute, so that a transparent resin layer-attached one-side-protected polarizing film was obtained.

<Preparation of Pressure-Sensitive-Adhesive-Layer-Attached Polarizing Film>

Subsequently, the pressure-sensitive adhesive layer formed on the release-treated surface of the release sheet (separator) was attached to the transparent resin layer formed on the one-side-protected polarizing film, so that a pressure-sensitive-adhesive-layer-attached polarizing film was obtained.

Examples 2 to 33 and Comparative Examples 1 to 7

One-side-protected polarizing films, transparent resin layer-attached one-side-protected polarizing films, and pressure-sensitive-adhesive-layer-attached polarizing films were prepared as in Example 1, except that the type of the one-side-protected polarizing film, the thickness of the transparent resin layer, the type of the polyvinyl alcohol-based resin used for the layer-forming material, and the presence or absence or content of the crosslinking agent (the content of the crosslinking agent is the value based on 100 parts of the polyvinyl alcohol-based resin) were changed as shown in Table 2.

The pressure-sensitive-adhesive-layer-attached polarizing films obtained in the examples and the comparative examples were evaluated as described below. The results are shown in Table 2.

<Single-Body Transmittance T and Polarization Degree P of Polarizer>

The single-body transmittance T and polarization degree P of the resulting one-side-protected polarizing films were measured using an integrating sphere-equipped spectral transmittance meter (DOT-3C manufactured by Murakami Color Research Laboratory Co., Ltd.).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other. Polarization degree $P (\%) = \{(Tp-Tc)/(Tp+Tc)\}^{1/2} \times 100$ Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

<Measurement of the Content of Boric Acid in Polarizer>

The polarizers obtained in the examples and the comparative examples were subjected to attenuated total reflection (ATR) spectroscopy using polarized light as the measurement light and using a Fourier transform infrared spectrometer (FTIR) (Spectrum 2000 (trade name) manufactured by PerkinElmer, Inc.), in which the boric acid peak (665 cm$^{-1}$) intensity and the reference peak (2,941 cm$^{-1}$) intensity were measured. The boric acid amount index was calculated from the formula below using the resulting boric acid peak intensity and reference peak intensity, and then the boric acid content (% by weight) was determined from the formula below using the calculated boric acid amount index.

(Boric acid amount index)=(the intensity of the boric acid peak at 665 cm$^{-1}$)/(the intensity of the reference peak at 2,941 cm$^{-1}$)

(Boric acid content (% by weight))=(boric acid amount index)×5.54+4.1

<Measurement of the Heat of Crystal Fusion of Transparent Resin Layer>

The heat (mj/mg) of crystal fusion was measured at a rate of temperature increase of 10° C./min using a DSC system (EXSTAR DSC6000 manufactured by Seiko Instruments Inc.).

The measurement sample may be a raw material powder itself or a PVA film obtained by applying an aqueous PVA solution (solid content 4%) to a PET film, in such a manner that, a several mm thick dry coating can be formed and then drying the coating. After, the measurement sample was aged for 24 hours in an environment at 23° C. and 50% RH, 3 mg of the resulting sample was placed in the sample pan of the DSC system and subjected to DSC measurement. The measurement conditions are shown below.

1st Run
   Holding at −30° C. for 3 minutes and then heating at 10° C./min to 300° C.
   Cooling at 30° C./min from 300° C. to −30° C.

2nd Run
   Holding at −30° C. for 3 minutes and then heating at 10° C./min to 300° C.
   Cooling at 30° C./min from 300° C. to −30° C.

The heat (mj/mg) of crystal fusion was calculated from the area of the endothermic peak observed from 190° C. to 230° C. in the 2nd Run heating curve of the data obtained by the measurement.

<Pot Life of Layer-Forming Material for Transparent Resin Layer>

The viscosity (cps) of each layer-forming material (aqueous solution) was measured at liquid and air temperatures of 23° C. using Rheometer RS1 (manufactured, by Haake) with Coaxial Cylinder Model 222-1267.

The viscosities X and Y of the layer-forming material (aqueous solution) were measured immediately after the preparation thereof and 6 hours after the preparation thereof, respectively. In the evaluation, the case where the viscosity Y was twice or less the viscosity X was rated by the symbol "○," and the case where the viscosity Y was more than twice the viscosity X was rated by the symbol "x."

<Suppression of the Occurrence of Nano-Slits (Guitar Pick Test)>

A piece with a size of 50 mm×150 mm (50 mm in the absorption axis direction) was cut from the resulting pressure-sensitive-adhesive-layer-attached polarizing film. The resulting piece was called sample 11. When sample 11 used, surface protective film 6 for test prepared by the method described below was bonded to the transparent protective film 2 side of sample 11.

(Surface Protective Film for Test)

A backing-forming material of low-density polyethylene with a melt flow rate of 2.0 g/10 min at 190° C. and a density of 0.924 g/cm$^3$ was supplied to an inflation molding machine for co-extrusion.

At the same time, a pressure-sensitive adhesive-forming material of a propylene-butene copolymer (propylene:butene=85:15 in weight ratio, atactic structure) with, a melt, flow rate of 10.0 g/10 min at 230° C. and a density of 0.86 g/cm$^3$ was supplied to the inflation molding machine, with a die temperature of 220° C. and subjected to co-extrusion. A surface protective film composed of a 33-µm-thick backing layer and a 5-µm-thick pressure-sensitive adhesive layer was produced in this way.

Figure 5A:
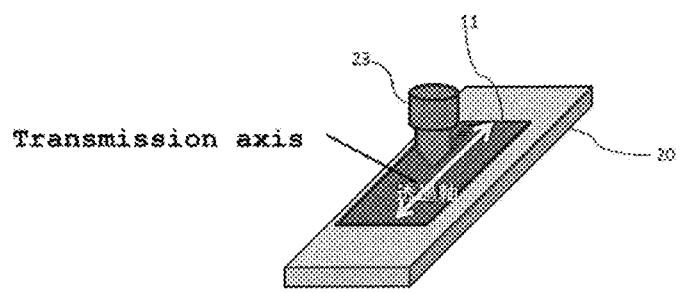
FIGS. 5(A) and 5(B) are schematic views illustrating items to be evaluated for nano-slits in examples and comparative examples.
Figure 5B:
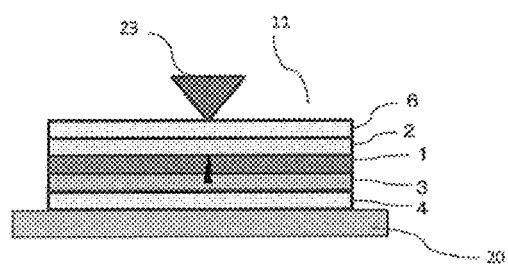

As illustrated in the schematic view of FIG. 5(A) and the cross-sectional view of FIG. 5(B), the release sheet (separator) was removed from the sample, which was then bonded to a glass plate 20 with exposed pressure-sensitive adhesive layer 4 interposed therebetween.

Subsequently, a load of 200 g was applied from a guitar pick (Model No. HP2H (HARD) manufactured by HISTORY) to the center of sample 11 (surface protective film 6 side), and the applied load was reciprocated 50 times within a distance of 100 mm in the direction perpendicular to the absorption axis of polarizer 1 of sample 11. The load was applied to one portion.

Subsequently, after sample 11 was allowed to stand in an environment at 80° C. for 1 hour, it was evaluated whether light-leaking cracks occurred in sample 11, based on the following criteria.
   A: no cracks
   B: 1 to 100 cracks
   C: 101 or more cracks Suppression of Expansion of Nano-Slits (Rock and Roll Test)>

In this test, scratches were formed, by the method described below, on polarizer 1 of one-side-protected polarizing film 10 obtained before the formation of the transparent resin layer in each of the examples and the comparative examples. Thereafter, transparent resin layer-attached one-side-protected polarizing film 11 was prepared.

Subsequently, after transparent resin layer-attached one-side-protected polarizing film 11 was allowed to stand in an environment at 80° C. for 1 hour, it was evaluated whether light-leaking cracks occurred in sample 11, based on the following criteria.
   A: no cracks
   B: 1 to 100 cracks
   C: 101 to 200 cracks
   D: 201 or more cracks <<How to Form Scratches>>

A piece with a size of 50 mm×150 mm (50 mm in the absorption axis direction) was cut from resulting one-side-protected polarizing film 10. Sample 10 used was a laminate obtained by bonding surface protective film 6 for test (shown above) to the transparent protective film 2 side of the cut piece.

Figure 6A:
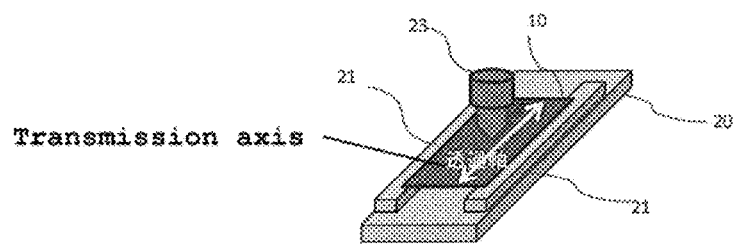
FIGS. 6(A) and 6(B) are schematic views illustrating items to be evaluated for nano-slits in examples and comparative examples.
Figure 6B:
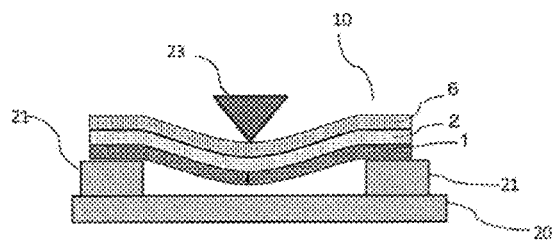

As illustrated in the schematic view of FIG. 6(A) and the cross-sectional view of FIG. 6(B), two glass supports 21 of 25 mm wide×5 mm high were placed parallel at a distance of 15 mm between their inner sides on a glass plate 20. Sample 10 obtained through the cutting was placed in such a manner that the direction perpendicular to the absorption axis of polarizer 1 of sample 10 was parallel to the longitudinal direction of the two glass supports and both sides of sample 11 were evenly supported on the two glass supports. Sample 10 was placed with surface protective film 6 facing upward.

Subsequently, a load of 100 g was applied from a guitar pick (Model No. HP2H (HARD) manufactured by HISTORY) to the center of sample 10 (surface protective film 6 side), and the applied load was reciprocated 10 times within a distance of 100 mm in the direction perpendicular to the absorption axis of polarizer 1 of sample 11, so that scratches were formed on the surface of polarizer 1. The load was applied to one portion. Subsequently, it was visually observed whether or not nano-slits occurred.

The films of Comparative Examples 2 and 4, in which the polarizer had a thickness of more than 10 μm, were broken upon the formation of nano-slits in the rock and roll test due to high shrinkage stress inside the polarizer. This made the evaluation impossible.

Figure 7A:
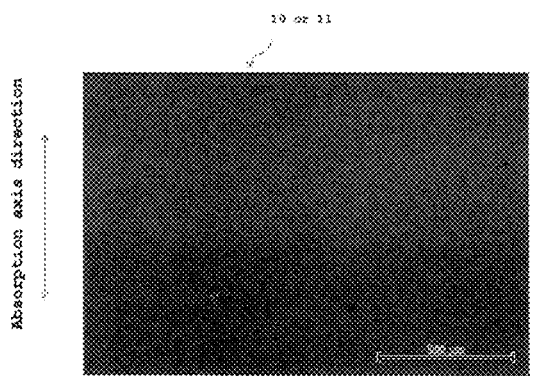
FIGS. 7(A) and 7(B) are exemplary photographs showing whether cracks are caused try nano-slits, for the evaluation of examples and comparative examples.
Figure 7B:
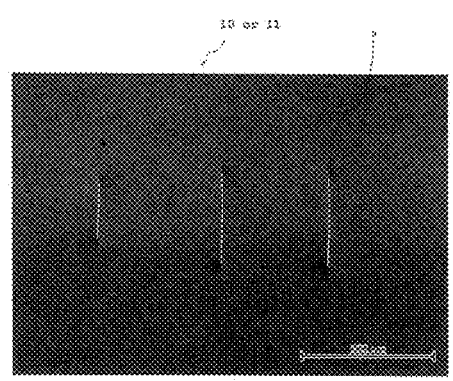

FIGS. 7(A) and 7(B) are each an exemplary micrograph of the polarizing film surface, which provides the measure below for identifying light-leaking cracks (nano-slits a) in the guitar pick testing and rock and roll testing of one-side-protected polarizing film 10 or transparent resin layer-attached one-side-protected polarizing film 11. In FIG. 7(A), any light-leaking cracks caused by nano-slits a are not found. The state shown in FIG. 7(A) corresponds to the state before the heating in the guitar pick test on the comparative examples, the state before the heating in the rock and roll test on the examples, and the state after the heating in the rock and roll test on the examples (nano-slits do not cause light leakage due to the expansion-suppressing effect). On the other hand, FIG. 7(B) shows a case where three light-leaking cracks occur in the direction of the absorption axis of the polarizer due to nano-slits a formed by heating. The state shown in FIG. 7(B) corresponds to the state after the heating in the guitar pick test on the comparative examples and the state after the heating in the rock and roll test on the comparative examples. FIGS. 7(A) and 7(B) were obtained by observing the samples suffering from nano-slits using a differential interference microscope. When each sample was photographed, another sample with no nano-slits was placed on the lower side (transmitted light source side) of the sample suffering from nano-slits in such a manner that they were in a crossed-Nicols arrangement, and then they were observed with transmitted light.

<Observation of Through Cracks (Heat Shock Test)>

A piece of 50 mm×150 mm (50 mm in the absorption axis direction) and a piece of 150 mm×50 mm (150 mm in the absorption axis direction) were cut from each resulting pressure-sensitive-adhesive-layer-attached polarizing film. The cut pieces were bonded in the directions of crossed Nicols to both sides a 0.5-mm-thick non-alkali glass sheet to form a sample. The sample was exposed to the environment of 100 cycles of heat shock from −40 to 85° C. each for 30 minutes. Subsequently, the sample was taken out and visually observed for the presence or absence of through cracks (and the number of through cracks) in the pressure-sensitive-adhesive-layer-attached polarizing film. This test was performed five times. The evaluation was performed according to the following.

◯: No through crack is observed.

x: A through crack or cracks are observed.

Figure 8:
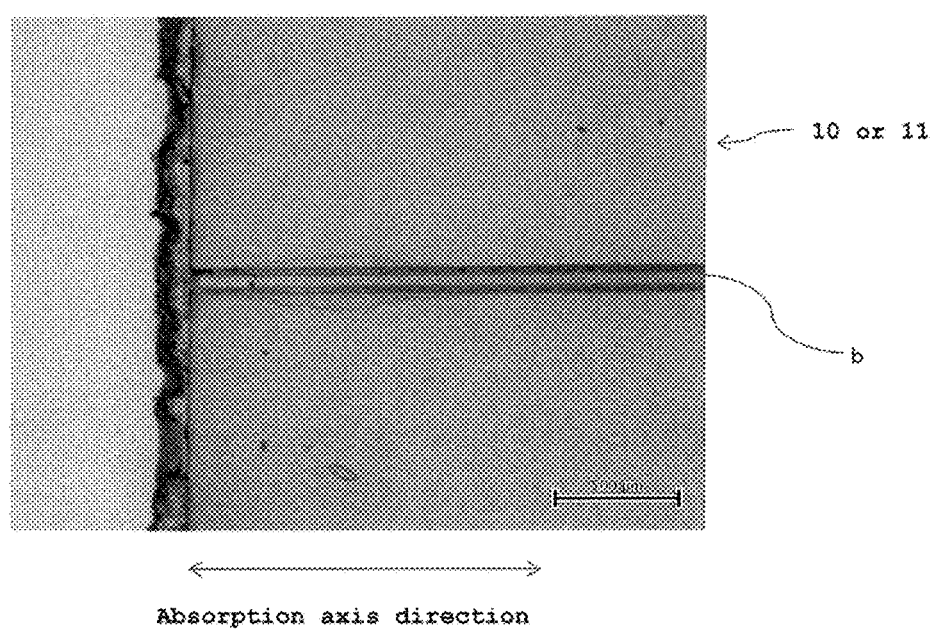
FIG. 8 is an exemplary photograph showing progress of a through crack for the evaluation of examples and comparative examples.

FIG. 8 is an exemplary micrograph of the polarizing film surface, which provides a measure for identifying a through crack b in one-side-protected polarizing film 10 or transparent resin layer-attached one-side-protected polarizing film 11. FIG. 8 was obtained by observing the sample suffering from a through crack using a differential interference microscope.

<Moist Heat Resistance (Rate of Change in Polarization Degree (Optical Reliability Test))>

A piece with a size of 25 mm×50 mm (50 mm in the absorption axis direction) was cut from each resulting one-side-protected polarizing film. The cut piece (sample) of the one-side-protected polarizing film was stored in a thermo-hygrostat at 85° C. and 85% RH for 150 hours. The polarization degree of the one-side-protected polarizing film sample was measured before and after the storage using an integrating sphere-equipped spectral transmittance meter (DOT-3C manufactured by Murakami Color Research Laboratory Co., Ltd.), and used for the calculation of: rate (%) of change in polarization degree=(1−(the polarization degree after the storage)/(the polarization degree before the storage)).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other. Polarization degree P (%)=$\{(Tp-Tc)/(Tp+Tc)\}^{1/2} \times 100$ Each transmittance was expressed as the Y value, which was obtained through luminosity correction, using the two-degree field (illuminant C) according to JIS Z 8701 when the transmittance for completely polarized light obtained through a Glan-Taylor prism polarizer was normalized to 100%.

The evaluation was performed according to the following.

⊙: The rate of change in polarization degree is less than 0.50%.

◯: The rate of change in polarization degree is from 0.50% to less than 1.00%.

Δ: The rate of change in polarization degree is from 1.00% to less than 2.00%.

x: The rate of change in polarization degree is from 2.00% to less than 5.00%.

xx: The rate of change in polarization degree is 5.00% or more.

<Water Resistance (Warm-Water Test)>

A piece with a size of 25 mm×50 mm (50 mm in the absorption axis direction) was cut from each resulting one-side-protected polarizing film. The cut piece (sample) of the one-side-protected polarizing film was immersed in pure water at 60° C. for 6 hours. Subsequently, after the polarizing film sample was taken out of the pure water and wiped with a dry cloth, an image of the polarizing film sample was captured and then binarized. The area of the non-discolored part of the polarizing film sample was determined from the binarized image. When the remaining area ratio expressed by the formula below is 70% or more, the water resistance of the polarizing film can be evaluated as being good. Remaining area ratio (%)=(the area after the immersion)/(the area before the immersion)

TABLE 2

| | One-side-protected Polarizer | | | | | PVA resin layer | | | | | | Evaluations | | | | | |
|---|---|---|---|---|---|---|---|---|---|---|---|---|---|---|---|---|---|
| | | Single-body | | | | | PVA resin | | | | Heat (mj/mg) of crystal fusion | Nano-slits | | Suppression of occurrence of through crack | Optical reliability (moisture resistance) | | Water resistance Remaining area ratio | Pot life |
| | Type | Thickness (μm) | Transmittance T (%) | Polarization degree P (%) | Boric acid content (wt %) | Thickness (μm) | Type | Saponification degree | Polymerization degree | Modification of PVA | Crosslinking agent | | Expansion suppression | Occurrence suppression | | Change in polarization degree | Evaluation | | |
| Example 1 | A0 | 5 μm | 42.8 | 99.99 | 16 | 1.0 μm | A | 99.0% | 2500 | — | Absent | 41.2 | A | A | ○ | 0.06% | ⊚ | 72.8% | ○ |
| Example 2 | A0 | 5 μm | 42.8 | 99.99 | 16 | 2.0 μm | A | 99.0% | 2500 | — | Absent | 41.2 | A | A | ○ | 0.52% | ○ | 71.2% | ○ |
| Example 3 | A0 | 5 μm | 42.8 | 99.99 | 16 | 0.8 μm | A | 99.0% | 2500 | — | Absent | 41.2 | A | A | ○ | 0.04% | ⊚ | 73.2% | ○ |
| Example 4 | A0 | 5 μm | 42.8 | 99.99 | 16 | 0.5 μm | A | 99.0% | 2500 | — | Absent | 41.2 | A | A | ○ | 0.02% | ⊚ | 74.6% | ○ |
| Example 5 | A0 | 5 μm | 42.8 | 99.99 | 16 | 0.2 μm | A | 99.0% | 2500 | — | Absent | 41.2 | A | A | ○ | 0.09% | ⊚ | 73.8% | ○ |
| Example 6 | A0 | 5 μm | 42.8 | 99.99 | 16 | 1.0 μm | B | 99.7% | 2500 | — | Absent | 56.9 | A | A | ○ | 0.09% | ⊚ | 75.8% | ○ |
| Example 7 | A0 | 5 μm | 42.8 | 99.99 | 16 | 1.0 μm | C | 99.0% | 1700 | — | Absent | 36.3 | A | A | ○ | 0.11% | ⊚ | 72.2% | ○ |
| Example 8 | A0 | 5 μm | 42.8 | 99.99 | 16 | 1.0 μm | D | 99.0% | 1000 | — | Absent | 53.6 | A | A | ○ | 0.16% | ⊚ | 71.3% | ○ |
| Example 9 | A0 | 5 μm | 42.8 | 99.99 | 16 | 1.0 μm | E | 99.0% | 500 | — | Absent | 49.9 | A | A | ○ | 0.03% | ⊚ | 62.7% | ○ |
| Example 10 | A0 | 5 μm | 42.8 | 99.99 | 16 | 1.0 μm | F | 98.0% | 2500 | — | Absent | 10.6 | A | A | ○ | 1.32% | △ | 63.8% | ○ |
| Example 11 | A0 | 5 μm | 42.8 | 99.99 | 16 | 1.0 μm | G | 96.0% | 2500 | — | Absent | 28.8 | A | A | ○ | 1.13% | △ | 57.2% | ○ |
| Example 12 | A0 | 5 μm | 42.8 | 99.99 | 16 | 1.0 μm | H | 99.0% | 1200 | Acetoacetyl-modified | Absent | 38.2 | A | A | ○ | 0.28% | ⊚ | 72.8% | ○ |
| Example 13 | A0 | 5 μm | 42.8 | 99.99 | 16 | 1.0 μm | I | 99.0% | 1200 | Acetoacetyl-modified | Methylol-melamine 5 parts | 34.2 | A | A | ○ | 0.20% | ⊚ | 74.9% | ○ |
| Example 14 | A0 | 5 μm | 42.8 | 99.99 | 16 | 1.0 μm | J | 99.0% | 1200 | Acetoacetyl-modified | Methylol-melamine 20 parts | 11.2 | A | A | — | — | — | 76.8% | X |
| Example 15 | A0 | 5 μm | 42.8 | 99.99 | 16 | 1.0 μm | K | 99.0% | 1700 | Carbonyl-modified | Absent | 51.4 | A | A | ○ | 1.40% | △ | 71.9% | ○ |
| Example 16 | A0 | 5 μm | 42.8 | 99.99 | 16 | 1.0 μm | L | 99.0% | 1700 | Carbonyl-modified | Dihydrazine 10 parts | 15.3 | A | A | — | — | — | 74.3% | X |
| Example 17 | A0 | 5 μm | 42.8 | 99.99 | 16 | 1.0 μm | M | 99.4% | 2000 | — | Absent | 43.5 | A | A | ○ | 0.07% | ⊚ | 74.3% | ○ |
| Example 18 | A0 | 5 μm | 42.8 | 99.99 | 16 | 1.0 μm | N | 97.0% | 1700 | — | Absent | 25.7 | A | A | ○ | 1.18% | △ | 61.1% | ○ |
| Example 19 | A0 | 5 μm | 42.8 | 99.99 | 16 | 1.0 μm | O | 99.0% | 1700 | — | Absent | 39.3 | A | A | ○ | 0.13% | ⊚ | 73.7% | ○ |
| Example 20 | A0 | 5 μm | 42.8 | 99.99 | 16 | 1.0 μm | P | 99.0% | 4000 | — | Absent | 43.4 | A | A | ○ | 0.25% | ⊚ | 77.2% | ○ |
| Example 21 | A0 | 5 μm | 42.8 | 99.99 | 16 | 1.0 μm | Q | 96.0% | 1700 | — | Absent | 26.9 | A | A | ○ | 1.21% | △ | 62.7% | ○ |
| Example 22 | A0 | 5 μm | 42.8 | 99.99 | 16 | 1.0 μm | M | 99.4% | 2000 | — | Absent | 43.5 | A | A | ○ | 0.03% | ⊚ | 72.1% | ○ |
| Example 23 | A4 | 5 μm | 42.8 | 99.99 | 16 | 1.0 μm | M | 99.4% | 2000 | — | Absent | 43.5 | A | A | ○ | 0.06% | ⊚ | 71.3% | ○ |
| Example 24 | A5 | 5 μm | 42.8 | 99.99 | 14 | 1.0 μm | M | 99.4% | 2000 | — | Absent | 43.5 | A | A | ○ | 0.10% | ⊚ | 74.0% | ○ |
| Example 25 | A1 | 5 μm | 42.8 | 99.99 | 18 | 1.0 μm | M | 99.4% | 2000 | — | Absent | 43.5 | A | A | ○ | 0.25% | ⊚ | 73.3% | ○ |
| Example 26 | A2 | 5 μm | 42.8 | 99.99 | 20 | 1.0 μm | M | 99.4% | 2000 | — | Absent | 43.5 | B | B | ○ | 0.23% | ⊚ | 72.9% | ○ |
| Example 27 | A3 | 5 μm | 44.1 | 99.99 | 16 | 1.0 μm | M | 99.4% | 2000 | — | Absent | 43.5 | A | A | ○ | 0.13% | ⊚ | 75.1% | ○ |
| Example 28 | A6 | 5 μm | 41.5 | 99.99 | 16 | 1.0 μm | M | 99.4% | 2000 | — | Absent | 43.5 | A | A | ○ | 0.37% | ⊚ | 74.2% | ○ |

TABLE 2-continued

| | | One-side-protected Polarizer Single-body | | | | | PVA resin layer | | | | | | Heat | Evaluations | | | | | |
|---|---|---|---|---|---|---|---|---|---|---|---|---|---|---|---|---|---|---|---|---|
| | | | | | | | PVA resin | | | | | | | Nano-slits | | Suppression of occurrence of through crack | Optical reliability (moisture resistance) | | Water resistance Remaining area ratio | Pot life |
| | Type | Thickness (μm) | Transmittance T (%) | Polarization degree P (%) | Boric acid content (wt %) | Thickness (μm) | Type | Saponification degree | Polymerization degree | Modification of PVA | Crosslinking agent | (mj/mg) of crystal fusion | Expansion suppression | Occurrence suppression | | Change in polarization degree | Evaluation | | |
| Example 29 | A0 | 5 μm | 42.8 | 99.99 | 16 | 1.0 μm | R | 88.0% | 1400 | — | Absent | 8.7 | A | A | ○ | 5.11% | XX | 58.3% | ○ |
| Example 30 | A0 | 5 μm | 42.8 | 99.99 | 16 | 1.0 μm | S | 93.0% | 1300 | — | Absent | 15.4 | A | A | ○ | 2.32% | X | 61.6% | ○ |
| Example 31 | A0 | 5 μm | 42.8 | 99.99 | 16 | 1.0 μm | T | 94.5% | 1700 | — | Absent | 20.3 | A | A | ○ | 2.18% | X | 63.5% | ○ |
| Example 32 | A0 | 5 μm | 42.8 | 99.99 | 16 | 1.0 μm | U | 94.5% | 3300 | — | Absent | 19.4 | A | A | ○ | 2.23% | X | 61.8% | ○ |
| Example 33 | A0 | 5 μm | 42.8 | 99.99 | 16 | 1.0 μm | V | 94.5% | 500 | — | Absent | 18.3 | A | A | ○ | 3.22% | X | 59.4% | ○ |
| Comparative Example 1 | A1 | 5 μm | 42.8 | 99.99 | 16 | 0.1 μm | A | 99.0% | 2500 | — | Absent | 41.2 | D | B | ○ | 0.09% | ⊙ | 74.0% | ○ |
| Comparative Example 2 | B | 23 μm | 42.8 | 99.99 | 16 | 1.0 μm | A | 99.0% | 2500 | — | Absent | 41.2 | Impossible to evaluate | A | X | 0.12% | ⊙ | 78.3% | — |
| Comparative Example 3 | A1 | 5 μm | 42.8 | 99.99 | 16 | | | | Absent | | | | D | C | ○ | 0.10% | ⊙ | 75.1% | — |
| Comparative Example 4 | D | 12 μm | 42.8 | 99.99 | 16 | 1.0 μm | A | 99.0% | 2500 | — | Absent | 41.2 | Impossible to evaluate | A | X | 0.40% | ⊙ | 78.1% | — |
| Comparative Example 5 | A1 | 5 μm | 42.8 | 99.99 | 14 | | | | Absent | | | | D | C | ○ | 0.33% | ⊙ | 77.1% | — |
| Comparative Example 6 | C | 3 μm | 38.4 | 99.99 | 16 | | | | Absent | | | | Not occurring | A | ○ | — | — | — | — |
| Comparative Example 7 | A8 | 3.5 μm | 43.2 | 99.15 | 16 | | | | Absent | | | | Not occurring | A | ○ | — | — | — | — |

The problems to be solved by the disclosure (the occurrence of through cracks and nano-slits) did not occurred when the optical, properties represented by the single-body transmittance T and the polarization degree P did not satisfy the condition of the following formula: $P>-(10^{0.929T-42.4}-1)\times100$ (provided that T<42.3) or P≥99.9 (provided that T≥42.3), as in Comparative Example 6 or 7.

Example 34

Example 34 was similar to Example 1, except that the one-side-protected polarizing film was used in the form of a long strip, the polyvinyl alcohol-based, layer-forming material was applied using a micro-gravure coater, and the release sheet (separator) and the surface protective film described below were used in the form of long strips. The resulting products were rolls of the transparent resin layer-attached one-side-protected polarizing film (with the structure shown in FIG. 2(A)) having the separator placed on the transparent resin layer side and having the surface protective film placed on the transparent protective film side. A set of rolls of the transparent resin layer-attached one-side-protected polarizing film were provided having widths corresponding to the short and long sides of a 32-inch non-alkali glass sheet, respectively, in order to be subjected to slit processing, in which the transparent resin layer-attached one-side-protected polarizing film was cut into pieces while being fed continuously.

(Surface Protective Film for Roll-to-Panel Process)

A surface protective film was obtained by applying an acryl-based pressure-sensitive adhesive with a thickness of 15 μm to the surface of an antistatic treatment layer-attached polyethylene terephthalate film (Diafoil T100G38 (trade name) manufactured by Mitsubishi Plastics, Inc., 38 μm in thickness) opposite to its antistatically treated surface.

Using a continuous production system for the roll-to-panel process shown in FIG. 9, the transparent resin layer-attached one-side-protected polarizing films were continuously supplied from the set of rolls, and the transparent resin layer-attached one-side-protected polarizing films were continuously bonded in a cross-Nicols relationship to both sides of each of 100 sheets of 0.5-mm-thick 32-inch non-alkali glass.

Examples 35 to 37

Examples 35 to 37 were similar to Example 34, except that the transparent resin layer-attached one-side-protected polarizing films were prepared by methods similar to those in Examples 2, 3 and 4, respectively.

<Observation of Occurrence, of Nano-Slits (Heating Test)>

A hundred sheets of non-alkali glass each provided with the transparent resin layer-attached one-side-protected polarizing films bonded to both sides were placed in an oven at 80° C. for 24 hours and then visually observed for the presence or absence of nano-slits. No nano-slit-induced defect (light leakage) was observed in any of Examples of 34 to 37.

DESCRIPTION OF REFERENCE SIGNS

1 Polarizer
2 Transparent protective film
3 Transparent resin layer (a polyvinyl alcohol-based resin is a main component)
4 Pressure-sensitive adhesive layer
5, 5a, 5b Separator
6, 6a, 6b Surface protective film
10 One-side-protected polarizing film
11 One-side-protected polarizing film (with transparent resin layer)
12 Pressure-sensitive-adhesive-layer-attached polarizing film
20a, 20b Roll of pressure-sensitive-adhesive-layer-attached polarizing film (roll)
21a, 21b Pressure-sensitive-adhesive-layer-attached polarizing film (with surface protective film)
100 System for continuously producing image display devices
101a, 101b Polarizing film supply unit
151a, 151b Unwinding unit
152a, 152b Cutting unit
153a, 153b Peeling unit
154a, 154b Winding unit
201a, 201b Bonding unit
300 Orientation changing unit
P Image display panel
X Image display panel feed unit

The invention claimed is:

1. A one-side-protected polarizing film, comprising:
a polarizer;
a transparent protective film provided on only one surface of the polarizer; and
a transparent resin layer provided on another surface of the polarizer, wherein
the polarizer comprises a polyvinyl alcohol-based resin, has a thickness of 10 μm or less, and is designed to have a single-body transmittance T and a polarization degree P representing optical properties satisfying the condition of the following formula: $P>-(10^{0.929T-42.4}-1)\times100$ (provided that T<42.3) or P≥99.9 (provided that T≥42.3), and
the transparent resin layer has a thickness of 0.2 μm or more and is a product made from a layer-forming material comprising a polyvinyl alcohol-based resin and is an unstretched layer.

2. The one-side-protected polarizing film according to claim 1, wherein the transparent resin layer has a heat of crystal fusion of 30 mJ/mg or more.

3. The one-side-protected polarizing film according to claim 1, wherein the transparent resin layer has the thickness of less than 3 μm.

4. The one-side-protected polarizing film according to claim 1, wherein the polyvinyl alcohol-based resin for forming the transparent resin layer has a saponification degree of 99.0% or more and an average degree of polymerization of 1,000 or more.

5. The one-side-protected polarizing film according to claim 1, wherein the layer-forming material is free of any curable component.

6. The one-side-protected polarizing film according to claim 1, wherein the polyvinyl alcohol-based resin for forming the transparent resin layer is a polyvinyl alcohol resin.

7. The one-side-protected polarizing film according to claim 1, wherein the polarizer contains 25% by weight or less of boric acid based on the total weight of the polarizer.

8. A pressure-sensitive-adhesive-layer-attached polarizing film comprising: the one-side-protected polarizing film according to claim 1; and a pressure-sensitive adhesive layer.

9. The pressure-sensitive-adhesive-layer-attached polarizing film according to claim 8, wherein the pressure-sensitive adhesive layer is provided on the transparent resin layer of the one-side-protected polarizing film.

10. The pressure-sensitive-adhesive-layer-attached polarizing film according to claim 8, wherein the pressure-sensitive adhesive layer is provided on the transparent protective film of the one-side-protected polarizing film.

11. The pressure-sensitive-adhesive-layer-attached polarizing film according to claim 8, further comprising a separator provided on the pressure-sensitive adhesive layer.

12. The pressure-sensitive-adhesive-layer-attached polarizing film according to claim 11, which is in the form of a roll.

13. An image display device comprising the one-side-protected polarizing film according to claim 1.

14. An image display device comprising the pressure-sensitive-adhesive-layer-attached polarizing film according to claim 8.

15. A method for producing the one-side-protected polarizing film according to claim 1, comprising:
the polarizer;
the transparent protective film provided on only one surface of the polarizer; and
the transparent resin layer provided on another surface of the polarizer, wherein
the polarizer comprises a polyvinyl alcohol-based resin, has a thickness of 10 μm or less, and is designed to have a single-body transmittance T and a polarization degree P representing optical properties satisfying the condition of the following formula: $P > -(10^{0.929T-42.4}-1) \times 100$ (provided that $T<42.3$) or $P \geq 99.9$ (provided that $T \geq 42.3$),
the transparent resin layer has a thickness of 0.2 μm or more and is a product made from a layer-forming material comprising a polyvinyl alcohol-based resin, and
the transparent resin layer is provided by applying the layer-forming material comprising the polyvinyl alcohol-based resin on another surface of the polarizer.

16. A method for continuously producing an image display device, the method comprising the steps of:
unwinding the pressure-sensitive-adhesive-layer-attached polarizing film from the roll of the pressure-sensitive-adhesive-layer-attached polarizing film according to claim 12;
feeding the pressure-sensitive-adhesive-layer-attached polarizing film with the separator; and
continuously bonding the pressure-sensitive-adhesive-layer-attached polarizing film to a surface of an image display panel with the pressure-sensitive adhesive layer interposed therebetween.

* * * * *